US006386451B1

(12) United States Patent
Sehr

(10) Patent No.: US 6,386,451 B1
(45) Date of Patent: May 14, 2002

(54) TRAVEL SYSTEM AND METHODS UTILIZING MULTI-APPLICATION PASSPORT CARDS

(76) Inventor: Richard P. Sehr, 2276 Creek Bed Ct., Santa Clara, CA (US) 95054

( * ) Notice: Subject to any disclaimer, the term of this patent is extended or adjusted under 35 U.S.C. 154(b) by 0 days.

(21) Appl. No.: 09/562,050

(22) Filed: May 1, 2000

Related U.S. Application Data

(62) Division of application No. 09/083,565, filed on May 22, 1998, now Pat. No. 6,085,976.
(60) Provisional application No. 60/050,648, filed on Jun. 24, 1997.

(51) Int. Cl.[7] .............................................. G07B 15/02
(52) U.S. Cl. ...................................... 235/384; 235/492
(58) Field of Search ................................. 235/375, 380, 235/382, 384, 492; 902/3, 4, 5; 705/5, 6

(56) References Cited

U.S. PATENT DOCUMENTS

| 4,734,568 | A |   | 3/1988  | Watanabe ................ 235/487 |
| 4,821,118 | A |   | 4/1989  | Lafremier ............... 358/108 |
| 5,211,424 | A |   | 5/1993  | Bliss ..................... 281/15.1 |
| 5,310,999 | A |   | 5/1994  | Claus et al. ............ 235/384 |
| 5,459,304 | A | * | 10/1995 | Eisenmann ............. 235/380 |
| 5,490,217 | A |   | 2/1996  | Wang et al. ............ 235/492 |
| 5,566,327 | A | * | 10/1996 | Sehr ...................... 395/600 |
| 5,578,808 | A |   | 11/1996 | Taylor ................... 235/380 |
| 5,623,552 | A |   | 4/1997  | Lane ...................... 382/124 |
| 5,712,472 | A |   | 1/1998  | Lee ........................ 235/486 |
| 5,790,674 | A | * | 8/1998  | Houvener et al. ....... 380/23 |
| 5,815,252 | A | * | 9/1998  | Price-Francis .......... 356/71 |
| 5,973,731 | A | * | 10/1999 | Schwab .................. 348/161 |
| 6,018,739 | A | * | 1/2000  | McCoy et al. .......... 707/102 |

FOREIGN PATENT DOCUMENTS

| EP | 0 504 616 A1 | * | 9/1992 |
| FR | 2585153 A    | * | 1/1987 |
| FR | 2634570 A    | * | 1/1990 |

* cited by examiner

Primary Examiner—Karl D. Frech
Assistant Examiner—Diane I. Lee

(57) ABSTRACT

A travel system and methods that encompass a plurality of travel service providers and multi-application passport cards for the automated compilation, issuance, and utilization of the passport cards for said plurality of travel services, including the implementation of related application scenarios. The multi-application cards are realized by portable device technologies, such as, smart cards or pocket-sized computer devices, and have the ability to store and activate a traveler's permit for transportation and other passport services; as well as a monetary value for electronic payment means. Biometrics identification of cardholders, as well as cryptographic certification of card data and travel-related information, can optionally be encoded onto the cards and can be verified, including validated, at various point-of-service locations upon presentation of the card for utilization.

15 Claims, 3 Drawing Sheets

| PASSENGER/PASSPORT CARD | | | |
|---|---|---|---|
| BUTTON | BUTTON | . . . | BUTTON |

| CARDHOLDER/PASSENGER BACKGROUND |
|---|
| Label [Box]    INSTRUCTION - Window<br>. . . .<br>Label [Box]  [Box] |

| TRAVEL OPTIONS | | | |
|---|---|---|---|
| SELECTION TRANSPORT/SERVICE | | PAYMENT/CONFIGURATION | |
| ☐ Airplane<br>☐ Railroad<br>☐ Ship<br>☐ Other | SCROLL<br><br>Window | ☐ Form/Amount<br>☐ Type/Content<br>☐ Edit/Use<br>☐ Other | STATUS<br><br>Window |
| | INSTRUCTION - Window | | |

| ACCESS CONTROL | COMMUNICATIONS | CONFIRMATION |
|---|---|---|
| ☐ Authenticity Code<br>☐ Digital Signature<br>☐ Authorization Code | ☐ Read/Write<br>☐ Send/Receive<br>☐ Encrypt/Decrypt | ☐ Carrier/Service<br>☐ Passenger/Entity<br>☐ Data/Information |
| | INSTRUCTION-Window | |

| AUDIT TRAIL | | | |
|---|---|---|---|
| DATE | CARRIER/ACTIVITY | TRAVEL/SERVICE PROVIDED | COMMENTS |
| xx/xx/xxxx | Name/Address, Trip | Description, Outcomes, Statements | Remark/Explanation |

FIG. 3

TRAVEL SYSTEM AND METHODS UTILIZING MULTI-APPLICATION PASSPORT CARDS

This application is a divisional application of U.S. application Ser. No. 09/083,565 filed May 22, 1998, application 09/083,565 also claiming the benefit of Provisional Patent Application Ser. No. 60/050,648, filed Jun. 24, 1997.

BACKGROUND OF THE INVENTION

The travel system and methods are intended to be used throughout the travel industry, including by passengers, providers of travel services and transportation means, financial institutions and transaction processors offering electronic payment means and clearing of those payments, and by service providers of other travel-related services. To facilitate the intended use, a portable passenger card will be utilized. The card will be compiled and issued as a multi-application means for storage and processing of data and information, decision logic support and communications purposes, and identification and authentication schemes; as well as for hosting a traveler's pass, payment purse and a plurality of application-specific traveling services.

The system deploys a plurality of functional components and a set of computer programs to implement its operational tasks, including the communications of data and the usage of the passenger card between and among the above system user.

The functional components encompass, for example, PCs or other computing platforms, POS-terminals and PIN-tablets, ATM-machines, card read/write devices, biometrics boxes and other computer peripherals, and the passenger card per se. These components are connected via a multi-directional communications link to allow the exchange of data/information between and among the systems entities including the cardholder. The system components are off-the-shelf hardware devices that can be purchased from retailers/computer stores, procured from component manufacturers or its distributors, or acquired from providers of networking/communications services. The communication links can be implemented via the Internet or any other commercial available, wire-based or wireless network technology.

The computer programs perform the house-keeping assignments, computing and decisioning functions, application-specific routines, and the communications/networking tasks necessary for the system's operations and card usage. These programs further include security means, such as cryptographic schemes, digital signatures and authenticity codes, to protect the system, cardholders and card contents against fraudulent use. The software programs reside within the system's components including the electronic passenger card. In this way, a cardholder/system user can instruct the system to select and execute a plurality of computerized means or operational functions under the auspices of the software programs and the guidance of command buttons, template files and pull-up/pop-down menus embedded into the system or stored in the card.

The system further comprises a database scheme for storing a set of data and information in a distributed manner among a plurality of database components associated with the plurality of system users, including the passenger card. The database scheme comprises means for automatically interchanging a selected number of data elements, from among said set of data/information, between and among all database components via the communication link whenever such data elements are inputted including modified by a particular system entity. In this way, the network of system database components, including the passenger card per se, acts and behaves as a single integrated database that always contains and automatically delivers—anytime, anywhere—the most up to date set of those data and information.

SUMMARY OF THE INVENTION

Based upon the features and objectives of the travel system and methods, advantages of this invention include reduced administrative costs, improved productivity, better quality of service, and higher revenues associated with the issuance, usage, and processing of the computerized cards as compared to the deployment of paper/plastic-based traveling documents and of conventional payment methods.

The lower administrative costs are the result of less personnel needed for the automated issuance and maintenance of computerized passenger cards as compared to controlling and following-up on paper-based documents or printed media; of less resources and telecommunications costs required to collect and clear electronic payments as compared to cash, checks or plastic-based payments; and of reduced fraud facilitated via the card-based security features. For instance, the detection of and prevention against fraudulent use of unauthorized travel means will be automated, and the steps of verifying passengers and use rights will be consolidated.

The increased productivity is the result of substituting time consuming, labor intensive and error-prone manual operations, which are associated with traditional document processing platforms or with conventional payment environments, by the system's computerized means; as well as of streamlining repetitive tasks via electronic templates and automated communications exchange. For instance, several tasks previously performed by human operators for renewal purposes, can be eliminated due to the storage of reusable traveler's permits and reconfigurable utilization rights in the card. In addition, the passenger card will also eliminate data redundancy while reinforcing standards of practice, purging unnecessary operations, and automating repeating tasks.

The improved quality of service—when using the computerized card—is the result of achieving faster boarding or improved throughput at the point-of-service location, more service or product selections to choose from, up-to-date information available for micromarketing and inventory or money management purposes, and services renderable from remote locations. In addition, there is the convenience of using the same passenger card for transportation, identification, card-based payment means, and for other travel-related applications and services. This convenience factor will translate into an enhanced goodwill for the card issuer and acceptors as well.

Higher revenues will be achieved by allowing the passenger to earn frequent attendance and shopper points, which will lead to more loyal passengers and increased spending habits. The card can also generate incremental sales revenues by renting out card-space to corporate sponsors, such as for promotional programs or co-branding schemes. In addition, incremental sales revenues can also be generated via float income due to unused monetary value left in the passenger card or due to traveling services paid for but not claimed yet.

It is an objective of the present invention to provide a travel system and methods which utilize computerized cards for the automated use of a traveler's permit and of other travel-related documents, purchase of goods and services, and the rendering of other traveling services.

It is further an objective of the invention to provide a portable passenger card to store, process and communicate cardholder data, travel-related information, and electronic payment means.

It is further an objective of the invention to provide for a method of compiling the card data elements, which are also stored and maintained throughout a plurality of remote database components, and of issuing the card to a legitimate cardholder, which is entitled to use the card for a predefined purpose.

It is further an objective of the invention to provide for a method of altering including updating cardhodler data and travel-related information previously stored in the passenger card.

It is further an objective of the invention to provide for a method of admitting the cardholder for a particular transportation carrier or other traveling service based on a traveler's permit stored in the passenger card, and of verifying that the card data is authentic.

It is further an objective of the invention to provide for a method of using the passenger card for the purchase of goods and services offered by the plurality of service providers, and of determining if the card-based payment means is valid.

It is further an objective of the invention to provide for a method of implementing a plurality of applications via the corresponding application codes stored in the passenger cards; the codes define and protect the attributes and quantity of a particular application service to be implemented via the passenger card.

It is further an objective of the invention to provide for a method of coupling the passenger card to a remote database, and for downloading into the card a set of data and information or for communicating to the database selected card data or cardholder information.

The invention further includes a method for using a cryptographic scheme to authenticate the cardholder or system information and to guarantee a secure information exchange.

BRIEF DESCRIPTION OF THE DRAWINGS

FIG. 3 is a block diagram of one embodiment of the passenger card of the present invention.

DESCRIPTION OF A PREFERRED EMBODIMENT

This invention relates to an automated travel system and methods for facilitating via a portable passenger card device a plurality of applications, comprising storing transportation rights, service entitlements, and cardholder considerations into the passenger card; loading monetary values into the card and using the card for purchase of goods and services; presenting the card for passage through passenger stations and admission to transportation means; clearing payments made and rendering applications or services requested via the card; and communicating card data and related information between and among the system entities.

Figure 1:
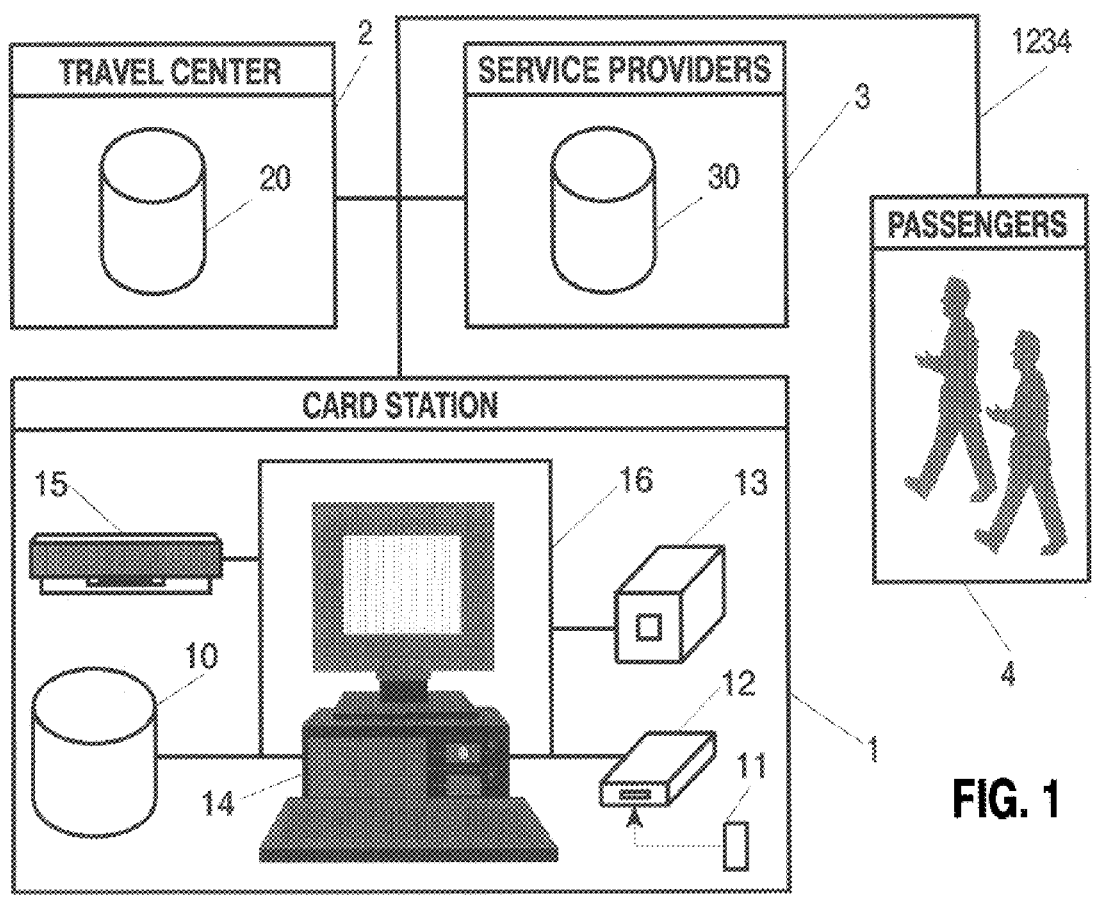
FIG. 1 is a block diagram illustrating one embodiment of a travel system, including the system's communication links and the structural components of a card station.

FIG. 1 depicts the functional components of a preferred travel system in accordance with the principles of the invention. The system and methods allow the issuance of a multi-application passenger card to individuals for traveling purposes, such as the use of airlines or other transportation carriers, as well as for the rendering of related services, such as on-line reservations and electronic payment means. To implement the system's operational tasks, commercially available hardware components and appropriate software programs and can be used. The hardware provides the computing infrastructure and the communication data links that integrate a plurality of remote system entities including the passenger card into a network. The computer software packages perform house-keeping functions, application-specific routines, networking and communication procedures, and utility tasks. This software also includes security means, such as cryptographic software programs and authenticity files, to protect the system information and card contents against fraudulent use. In addition, a passenger or any authorized user can instruct the system to select and execute a plurality of computerized means under the auspices of the software programs and the assistance and guidance of command buttons, template files and pull-up/pop-down menus embedded into the system. The hardware and software are distributed throughout the system entities including the passenger card.

The CARD STATION (1) allows a passenger, or any other entity, to interact with or couple to the system while planning and evaluating a particular trip or several travel itineraries, including making the appropriate reservations and loading the related ticket and travel information into the passenger card. The station can further be used to download monetary value into the passenger card, pay for travel-related services via the card-based means, and upload the electronic payments to a service provider. The station can also be used to compile the contents of the passenger card, so as to serve multiple application needs while hosting the related application modules in the same card. Such a station can comprise, for example, a PC-based setting used by passengers from home or at work, a card service station installed as an appropriate apparatus in public places, or a portable terminal accessed and served via on-line communications means.

The TRAVEL CENTER (2) provides the computerized means for the compilation and automated issuance of passenger cards and means for loading into the cards appropriate use rights, including electronic admission or passage rights for passengers. For example, the center can simulate and implement the tasks performed by the ticket vending machines installed at passenger stations, as well as the control functions exercised by the related entrance/exit gates. The center can also emulate a travel agent/office or any other marketer of travel information.

The SERVICE PROVIDERS (3) represent the service entities including individuals that support the card's usage and the system's operations while rendering a plurality of products and services to the passengers upon presentation of the passenger card. Such providers include the entities that provide the travel means and transportation carriers, as well as the services that are related to the use thereof. Providers further include a bank or financial institution that stores an electronic monetary value or other electronic payment means in the card, a credit reporting firm that verifies and guarantees the credit worthiness of the cardholder, a transaction processor that clears and credits the electronic payments made via the card, or a certification center that authenticates cardholders and card data. Providers can also comprise fast food vendors, retail outlets, concession stand owners, promoters of collectors cards, or Internet service and content providers.

The PASSENGERS (4) comprise the traveling individuals that use the transportation carriers and product offerings promoted by the service providers. These passengers also represent the consumers of products and services offered by the service providers at remote locations, such as advanced ticket purchasing stations, automated vending machines, travel agencies and entertainment entities, or providers of on-line services and multimedia offerings.

The distributed databases (10), (20) and (30) are associated with the plurality of remote system entities that comprise the card station, travel center and service providers, respectively. The above database scheme comprises database storage means for storing data and information in a distributed manner between and among those remote entities including the portable passenger card. The databases include the data records that relate to the system entities and to the passenger card contents. Further included is information including electronic template files, which implement the card's usage and the system's operations. Also stored are card data and system information to implement the communications and data security management functions. As a function of the amount and complexity of the data to be stored, the databases can be implemented via a variety of storage configurations. Solid state memory, magnetic tape, rotating media, video disks, and optical/laser media, are examples thereof. A major feature of the system is that these remote distributed databases including the passenger card, always contain the same set of data that is required to qualify a passenger for travel or service eligibility. In this way, when presented for service, the passenger card will contain the appropriate use rights, necessary entitlements, and adequate monetary values. The availability of this most up-to-date data is guaranteed by the system's build-in mechanism of communicating data in a real-time manner. In other words, if data changes or service/payment activities are performed by any one of the entities, all other entities including the passenger card will be automatically receiving this new information. Such an incremental exchange is not only fast and reliable, but also cost effective because of significant lower telecommunications expenditures. The passenger card, which can act as a portable database and/or off-line processing unit, also will free the system from lengthy and costly on-line modus of operandi, including on-line verifications and authorizations, while providing the bridge for stand alone or incompatible systems configurations.

To execute the means needed to communicate data and information between and among the passenger card and system databases, process and store card data and database information, as well as implement the decision logic means and software application programs, the card station comprises a plurality of components:

The database (10) is linked to the other databases distributed among and between all system entities, including the passenger card per se. The database stores the data and information relating to the travel services and transportation means available for selection, to the provider of transportation means and the passenger making the reservations, as well as to the transactions performed between the passenger and card station. The database data includes, for example, application codes, card and system file templates, menu screens, and user interface modules. The database data further includes the name, mailing/business address, telephone number, and other data about the transport provider and the passenger. The database also comprises unique identification numbers for the passengers or providers, account numbers with financial institutions, security keys and access codes used for cryptographic purposes and protection schemes, passenger lists and negative files including cancelled or fraudulent account numbers, and various validation codes. These latter codes are associated with the tickets or services, which are requested by the passengers and delivered by the provider, for proof and authentication of products/services being rendered, including returned by passengers for exchange or for money-back purposes. Further included is information relating to payment transactions, such as details about the service or merchandise purchased with the passenger card, electronic receipts for the cleared payments, and the passenger's purchase habits and related payment history.

The passenger card (11) includes "smart cards" that have a shape similar to plastic bankcards, but with at least one silicon chip/integrated circuit embedded into the card package. Such cards can further include PC (Personal Computer) card formats, handheld terminals or any pocket-sized computer configurations. The embedded circuits give the cards database storage means, processing and communications capabilities, or display means. The smart passenger card can therefore input, store, process, output, and display data relating to tickets, passengers, and system entities; as well as to services rendered via the card. The data stored in the card includes the equivalent of an electronic ticket for a particular itinerary, use rights for a specific transportation carrier, considerations for travel-related services, electronic money for payment, or security information for protecting the card content and identifying the rightful card holder. The cards further can display data inputted into or retrieved from the passenger card. The card data can be retrieved from (read operation) or loaded into (write operation) the card via a card read/write device or via traditional data input or retrieval means, such as a keyboard/mouse, pointing device, touch screen, or voice commands. This portable card can operate in a stand-alone and/or in an on-line modus of operandi.

The card reader (12) represents a card device that can read the passenger card's contents, as well as write information into the card; this read/write information can also be displayed onto the card reader. The card data can further be displayed and manipulated within the passenger card or on the monitor of a computer terminal. The passenger card can communicate, via such a read/write module, with the other system components including equipment that captures card data relating to text, graphics, audio or video information. This module can be a stand alone device, incorporated into computer terminals via appropriate plug-in boards, or implemented by the passenger card via built-in input or output ports.

The biometrics box (13) includes means for capturing and digitizing the biometrics characteristics information—such as fingerprints, voice, signature, eye characteristics, or picture/facial features—of a particular passenger. The captured biometrics can be stored in or imprinted onto the passenger card, as well as loaded into the database(s). The "life" biometrics can also be compared with biometrics information that was previously stored in the passenger card or in a remote database, to verify, for example, if a passenger is the legitimate card holder.

The computing platform (14) can be a multimedia personal computer—capable of processing and communicating text, data, audio, graphics and video—or any other computer configuration, such as a handheld computer terminal, general purpose personal computer, client/server-oriented networks, or a mainframe-based computer environment. This platform facilitates the computerized means including the gathering, organizing, evaluating, manipulation, processing, and exchanging of data and information. The computing platform also performs the decision logic means required for the system's implementation and the card's usage. Such a computing platform can further be used by the passengers to compile the card contents or request the rendering of services from remote locations (e.g. from their home or business premises).

The printer (15) allows the passenger to print out hardcopies including paper-based documents, such as tickets or travel statements and expense reports. When using thermal printing techniques, it can also be used to imprint text, logos, video images, or other related data and information onto the package of the passenger card.

The components of the card station are connected via a communication link (16) to allow the exchange of data and information throughout the card station. The components, including the station per se, also are connected via a global communication link (1234) to the rest of system entities. The data links can be implemented via any commercially available wired or wireless technology, such as cable/telephone lines, Internet service networks, or other digital or analog telecommunications media.

Figure 2:
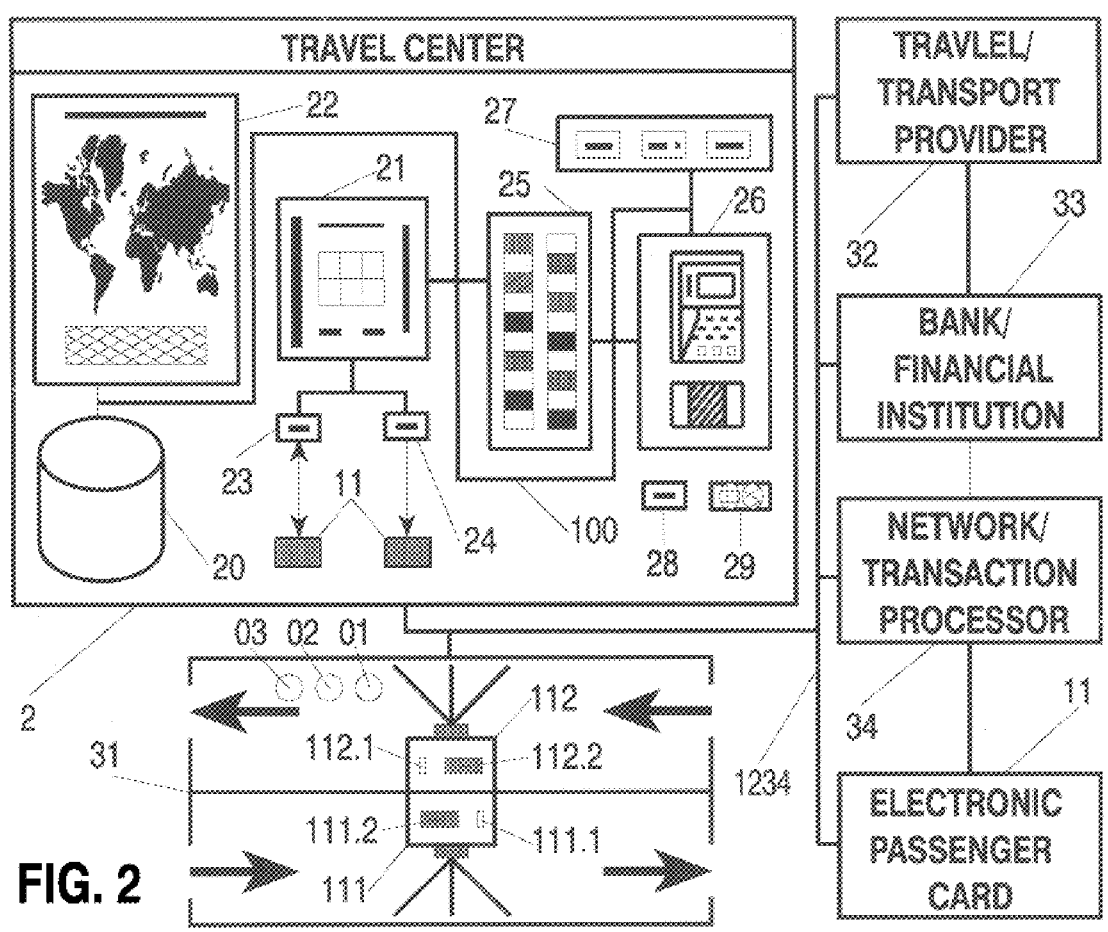
FIG. 2 is a block diagram depicting the travel system including a plurality of service providers and the functional components of a travel center; as well as the communication links between and among the system entities and the passenger card.

FIG. 2 illustrates the Travel Center (2) that provides the computerized means for the selection, payment and issuance of passenger cards; as well as for the storage in the cards of appropriate service entitlements and use rights. The center also provides the means to edit the contents of the passenger card, so as to represent a particular card configuration type. Such a center can be, for example, a ticket vending machine that is installed at an airport, a railroad station, or at a travel agency; as well as represent a provider of virtual services that are delivered via remote ticket offices, electronic shopping malls, or on-line travel support functions. Also shown is a Passenger Station (31) that controls access to the transportation carriers, as well as monitors possible connections relating to a particular travel itinerary including alternative transportation means. Further depicted are the plurality of service entities that provide the transportation carriers and render various services, as well as facilitate the support functions needed for the delivery of the appropriate goods and services. The Travel/Transport Provider (32) represents the entities that provide the transport means as well as the services associated therewith. Means for transportation may include airplanes, railroads, ships, automobiles, subways, buses, or rental cars. The services may comprise travel arrangements, such as reservations or cancellations and electronic ticketing or payments; transportation support, such as traffic management and capacity planning; and card-based marketing or sales promotions, such as loyalty and frequent traveling programs or other value-added benefits delivery schemes. The Bank/Financial Institution (33) represents the financial entity that facilitates the electronic payment process between the passenger and transport or other service providers, including the clearing/settlement of the electronic money exchanged via the communication link (1234). The Network/Transaction Processor (34) provides the infrastructure and services required for the processing of payments and transfer of electronic funds, including for the clearing and settlement of electronic transactions and related information. The Electronic Passenger Card (11) is the portable card used by the passenger to reserve a ticket or to purchase goods and services.

The TRAVEL CENTER facilitates the automated issuance of the passenger cards, including the loading into the card of an electronic ticket or of a permit authorizing the passenger for a specific itinerary, while employing the following software and hardware components:

The database (20) stores the data and information relating to the travel services and transportation means available for selection, to the provider of transportation means, and to the passenger making the reservations; as well as to the transactions and communications performed between the travel center and passenger. Further stored are electronic file templates including card templates that are used during the selection process, including for storage and communications purposes. The database includes, for example, the application/service codes and identification numbers of transportation services and carriers available to passengers. The codes authorize and trigger the implementation of the card-based applications. The codes are associated with the tickets or services requested by passengers, for proof and authentication of products/services being rendered by providers and used by cardholders, or returned by passengers for exchange or for cancellations, including for money-back purposes. The numbers are used to uniquely identify a particular transportation carrier a passenger buys a ticket for. The database also stores authenticity files and identification numbers of the passenger cards that are issued to or requested by the passengers; these files and numbers correspond to the authenticity codes and card numbers stored in the passenger cards. The database data further includes the name, mailing/business address, telephone number, and other data about the transport provider and the passenger. The database data also comprises unique identification numbers for the passengers or service providers, passenger lists, account numbers with financial institutions, negative files including cancelled or fraudulent account numbers, as well as security keys and access codes used for cryptographic purposes and protection schemes. The database further comprises a set of service or payment points that are underwritten by the provider, or any other entity. The points can be loaded into the passenger cards and accepted thereafter by selected service providers or by entities, as legal tender or as appropriate trade-ins. For instance, passengers can use the points for payment purposes or for exchange with certain use rights. The database further includes information relating to payment transactions, such as details about the service or ticket purchased via the passenger card, electronic receipts for the cleared payments, and the passenger's purchase habits and related payment history. Concerning the latter, the database also gathers marketing data about the passenger's travel itineraries, including the type and amount of services requested and products purchased at a particular location or over a specific time period. The database data further comprises certification numbers used for authentication of data and information that is communicated between and among the system entities including the passenger card. The database further comprises an audit trail concerning the system's operation and card's usage, including details about the selections made and data loaded into the card. This audit trail establishes the concept of non-repudiation with the help of a "Who did What-When-Where" recording; the recording is tamper proof and non-erasable.

The user interface module (21) allows the passenger to interact with the travel center while instructing the center, or system components networked therein and entities linked thereto, to execute the arithmetic and logical functions required for the compilation of the passenger card contents, and to implement the related storage tasks and communications routines required for the loading and exchange of data and information. To select the instructions and input or output data, various means, such as a keyboard, mouse, pen, track ball, voice command, touch screen, or wireless communications technologies, can be used. This module also displays onto a built-in monitor or computer screen data inputted or retrieved by the passenger, as well as information provided by the system entities. The monitor/screen can also display instructions about how to proceed while guiding the card user through the process of selecting a particular task to be performed. For instance, the user interface lets the passengers select and compile the details of a particular trip, request the issuance of an electronic ticket, pay for the ticket, and load the ticket and appropriate service entitlements or use rights into the passenger card. Also stored in the card can be a monetary value for electronic payments or security information for protecting the card content and identifying the rightful cardholder. Passengers can also select a new card from among a set of predetermined card types, manipulate the contents of cards previously issued, store security information into the card, or tailor the passenger card content for a particular application.

The travel map (22) lets the user explore various travel itineraries, while automatically providing alternative routes and related recommendations. For example, the passenger inputs into, or points and clicks on, the map the departure and destination locations, including the date of travel and number of tickets requested. In response thereto, the map compiles and provides a set of possible itineraries, including the ticket price and the departure and arrival times associated with the recommended alternatives. Should the trip require any connections, the map will also provide the necessary information, including the type of carriers and time/location of transfer. After a travel selection is made, the map will request appropriate payment and if adequate payment is provided, the selected information including electronic ticket and type of transportation carrier can be loaded into the passenger card. In addition to compiling a particular travel itinerary or reserving a specific trip arrangement, the service map can also evaluate alternative travel plans as a function of restrictions imposed by the passenger when requesting a ticket or transportation permit. For example, the passenger can instruct the map to recommend an itinerary that doesn't cost more than a predefined dollar amount or that needs to start and to conclude within a predefined time period, as well as to reserve a ticket that is valid for a particular seat assignment. The above dialogue and selections can be made directly on the map and/or via the user interface module; for example, via touch-sensitive means or conventional input/output means. To aid the passenger during the selection and evaluation process, the map can display, for example, the seating arrangements of a carrier, layout of premises and buildings, points of attractions, as well as the maps of streets, countries and the globe. For instance, the seating map can display the floor plan, including the status of seats that are still available, of a transportation carrier and allow the passenger to select the desired seating arrangements and related admission rights for that particular carrier; the selection process can be accomplished by pointing and clicking onto the seat that is displayed on the map. The selected seat assignments are also communicated in real-time to any other travel center that is authorized to sell tickets for the same carrier. The instantly available seating information across a network of ticket offices also facilitates the purchase of tickets from remote locations. For example, the cardholder can access, from home, the database containing seat assignments via the passenger card and/or a computer terminal, select and pay for the seat locations, and load the selections made into the passenger card as the corresponding ticket.

The card slot (23) allows the passenger/user to insert or retrieve the passenger card (11), including to couple the card to the travel center, for the purpose of reading (retrieving) and writing (loading) the card data, as well as of displaying or manipulating the card contents. The card slot (24) provides the passenger with a new card in response to the compilation of a blank card or to the selection of a predefined card type provided by the travel center. This slot can also print-out a label or provide a sticker showing the data stored in the card, such as information relating to the ticket and transportation carrier; the label/sticker can be affixed onto the passenger card, attached to any other media, or used as is. The new card can be compiled, including displayed onto the user interface module, or selected from the card tray (25) that contains a plurality of card types and predefined configurations. While compiling or selecting a new passenger card, the cardholder also has the option to choose from various text, logos, artworks, or audio and video files provided by the center. The compiled information and selected options can be loaded into or imprinted onto the passenger card.

The banking module (26) allows the passenger to pay for the tickets or for new passenger cards, as well as to load a monetary value or electronic payment points into the passenger card. To purchase the tickets or cards, the passengers can select appropriate payment means from among a set of options (27) that include cash, checks, ATM (Automated Teller Machine) cards, credit/debit banking cards, or a passenger card. The banking module verifies the received or requested payment data and related information for the purpose of authorizing and settling the appropriate payment options. This verification and clearing process can be accomplished via a network transaction processor by communicating with the banking module for the purpose of settling the appropriate fund transfers, or via the passenger card by deducting the monetary value or payment points previously stored in the card. The card slot (28) accepts the credit/debit card, check, passenger card or any other media representing a particular money equivalent, so as to capture the information recorded or imprinted onto such media. The captured information can be used in conjunction with the payment data for the implementation of the selected payment option, as well as for the storage in the card as a monetary value. In the later case, this information can be digitized and stored in the passenger card as an electronic representation of traditional payment means. For instance, the banking module facilitates the storing in the passenger card of electronic payment forms, which represent cash or plastic-based banking cards, together with digital money allocated thereto. The monetary value can also be downloaded via on-line communication means, such as from a checking account or line of credit. Also loaded into the passenger card can be electronic payment points, which represent use or consumption rights underwritten by the non-banking entity. For example, the transport provider provides the passenger, in exchange for adequate payment or a predetermined amount of travel miles, a set of payment points that can be used for future purchases of tickets or services at selected providers accepting those points. After acceptance, the payment points can be redeemed by the transport provider and credited to the providers' account as traditional money.

The module (29) serves as a two-way communication means to exchange audio, video, or any other data and information between the passenger and the entity that services and maintains the travel center. For example, this capability can be used to report issues observed or to solve problems encountered by a passenger engaged into a dialogue with the travel center.

The PASSENGER STATION monitors and controls access to a particular transportation carrier, as well as to connecting carriers used throughout different travel segments of a particular itinerary. The station manages the passenger flow to or from the transportation carriers while verifying the card-based ticket, including related information stored in the passenger card, via the access control modules (111) and (112). These module can be installed at the entrance or exit gates at the premises where passengers can board a transportation carrier (e.g. at railroad stations or airport facilities) or where transportation vehicles can have access to (e.g. at toll bridges or cargo ships). The modules can also be placed on the transportation carrier per se (e.g. on a bus or any other public transportation vehicle). Upon coupling the passenger card to the control module, the modules monitor the admission to or departure from the premises—or access to or exit from the carrier—while reading the card-based ticket information and other related card data. In this way, the modules can, for example, verify the passenger's identity or compute the number of passengers boarding the carrier, so as to compare the passengers being admitted against the list of authorized passengers or the carrier's maximum capacity. The modules can also compile the total number of passengers being admitted/transported over a predetermined time period, including by a particular transportation carrier. Such demographics information, together with other passenger or travel related data, can be gathered and forwarded to the transport provider for marketing/promotional programs. The modules can further compile the availability of open seats, if reservations are required or the carrier's capacity is monitored, as well as match the ticket holders with their luggage items. In the latter context, the passenger's luggage will be identified at check-in time; for instance, with a tag using a bar code means. The tag-related information will also be included into the card-based ticket, so as to allow the cross-reference between passengers, who have boarded onto the carrier, and the luggage items, which have been loaded into the cargo hold of that carrier. As an outcome of this comparison, the module can flag that all luggage is accounted for and could be correlated to a particular passenger, or that some items have no owner and therefore should be removed because no matching passenger could be established. The module can also convey a message if a luggage item was checked-in but not loaded yet onto the carrier; for example, the control module can detect the missing item when verifying the card-based ticket at boarding time and alert the carrier-personnel accordingly. The modules can also scan ID (Identification) documents for the purpose of retrieving and evaluating selected information recorded onto such documents. For example, the DOB (Date Of Birth) data or the cardholder's picture can be captured from a valid driver's license to determine the age or physical appearance of the passenger presenting the license. Also captured can be the information from a passport, such as the passenger's place of birth and citizenship, or data from other paper/plastic-based documents. Such information/data can be verified, including compared against Government databases, so as to authenticate the background of the passenger or provide the data required for other travel-related purposes.

The card slots (111.1) and (112.1) allow the cardholder to insert and retrieve the passenger card, including to couple the card to the control module, so as to permit the module to read the card data including the electronic ticket stored in the card, verify the card data, and store data in the card. This card-based ticket information can also be projected onto a display panel that communicates with the control modules. If the passenger card is authentic and contains the appropriate access rights, the control modules allow the passage through the gate the modules are coupled with; otherwise deny the passage including signals the unauthorized attempt. For instance, if the card-based ticket qualifies a passenger to use a particular transportation carrier, access to that carrier is approved; otherwise a message conveyed that the passenger must use a different carrier or purchase another ticket. Or, if the electronic ticket stored in the card contains a valid seat assignment with the correct time, date and location, then the mechanical arm activated by the control module permits the passenger to enter or exit the premissies; otherwise passage is blocked through the gate. If approved for passage, an appropriate admission, or exit, stamp will be loaded into the passenger card. These stamps, which contain time-stamped information relating to the tickets or any other permit, are tamper proof and can be stored only by the control module. For instance, the admission stamp identifies the cardholder as being lawfully admitted, via the card-based ticket, to use a transportation carrier, including to access the premises where the carrier is based. The admission stamp also voids the card-based ticket once admission is approved and/or access or boarding accomplished, so as to inhibit the fraudulent use of the same ticket for multiple trips that are not qualified via that ticket. If the ticket qualifies the passenger for a return trip or connecting transportation means, the appropriate ticket-segment(s) will be preserved for the return or connecting trip. This can be achieved by compiling a master-admission stamp that generates the set of appropriate slave-admission stamps corresponding to the individual ticket segments, or by generating a set of consecutive admission stamps whenever the card is presented for those particular segments of the trip. The admission stamp is valid only for a particular itinerary and cannot be used in lieu of a ticket for another travel purpose; for example, it is valid for a predetermined time period(s) or a predefined transportation carrier(s), but will be automatically erased once the access rights become invalid or after the journey concludes. For instance, the admission stamp will be voided whenever a passenger leaves the carrier, including the premises the carrier is stationed at, unless the card is presented to the control module at the exit gate with the intent of re-entry to the same carrier/premises or to access connecting carriers. For example, when the card is coupled to the exit gate, the control module will verify the admission stamp previously stored in the card, and if successful, generate and load an appropriate exit stamp into the passenger card. When presented at the entry gate, the card-based exit stamp will be verified, and if valid, allow the passenger to pass through the entry gate or board the carrier. If more than one carrier, including different premises, will be used by the passenger during connecting trip segments, access to those carriers/premises will be granted via the master-admission stamp stored in the card at the beginning of the trip, via the individual admission stamps compiled whenever the card is presented to the control module(s) at the related entrance gates, or via the exit stamp generated after exiting or concluding a previous trip segment. The admission stamp also prevents the use of more than one ticket for the same seat assignment or the same transportation carrier. The control module prohibits the compilation of more than one admission stamp based upon the same ticket, as well as of more than one exit stamp based upon the same admission stamp. This stamp can be further used to qualify the passenger for certain privileges or considerations; for example, to receive a free gift or frequent travel mileage for being the one millionth passenger taking a particular itinerary or using a particular carrier.

The biometrics modules (111.2) and (112.2) at the entrance and exit gate serve as an additional security means for controlling the passenger flow and for safeguarding the passenger cards. These two modules can be used to capture the passenger's biometrics characteristics, such as fingerprints or voice imprints, and compare the captured data with biometrics information previously stored in the passenger card; the captured biometrics can also be loaded into the card or any of the system databases. For example, a passenger might want to protect a travel permit or ticket, which is hosted by the passenger card, while attaching a particular biometrics to the card-based permit/ticket. When presented at the entrance gate, the control module requests confirmation and the cardholder must provide the identical biometrics to unlock the transportation rights; otherwise the permit or ticket cannot be retrieved nor displayed, and access is not allowed. Or a ticket holder leaving the carrier or premisses, might want to capture and temporarily store a particular biometrics in the passenger card to make sure that nobody else can use the card for re-entry, including multiple access purposes. When the passenger card is presented at the entrance gate, the matching "life" biometrics must be provided in addition to the exit stamp, to have access allowed; otherwise re-entry is denied. In addition, these modules can also provide the input means for scanning the physical appearance of a passenger and for communicating it to the control module; the appearance can then, for example, be compared against the photo scanned from an ID document or the picture stored in the passenger card per se. To safeguard the process of using biometrics information for multiple re-entries, the biometrics modules at the entrance gate can be used only by passengers arriving for access or boarding purposes, and the biometrics module at the exit gate only by passengers leaving the carrier including the corresponding premisses.

FIG. 3 illustrates the functional structure, including the electronic card template of the multi-application passenger card including a passport card, which facilitates the card's computerized means for compiling the card contents and for communicating data and information between and among the remote databases including the portable passenger card. The means includes the capturing, inputting, storing, retrieving, displaying, evaluating, computing, processing, and exchanging of the data/information needed for the card's usage and the system's operation. The card contents can also be manipulated, displayed, and exchanged via commercially available computer terminals, such as personal computers, POS terminals, or automated data collection and inputting means that are coupled to the passenger card. To safeguard the card contents and protect the data exchange, the card issuer, system entities or cardholder can load authenticity data and security information into the passenger card. To allow the communication between proprietary platforms, the card data and database information can be automatically translated or converted from a particular data format and contents into data/information with another format and contents. The passenger card comprises a plurality of data fields, distributed between and among the card and/or system components, to facilitate the card-based functions and operational tasks of the system:

The BUTTON fields trigger and facilitate the storage, processing, and decision logic means required for the implementation of arithmetic and logic operations, as well as of communications management functions. Such means retrieve and display, for example, the card data, edit the data, and store the edited data in the card or communicate it to the remote databases. Such means further process monetary values stored in the card for the payment of travel tickets or for other goods and services, compute the required payments and the remaining card balances, attach a time stamp to the computations, and communicate the results with the card and databases. Such means further verify the validity and expiration dates of the use rights data stored in the card, checks the authenticity of the card data, and determine if a passenger card should be approved or denied for access to a carrier or for other services. When selected, these buttons display a set of pop-up or pull-down menus that aid the user in understanding and implementing the card's operation.

The CARDHOLDER/PASSENGER BACKGROUND field comprises data and information, which relate to the passenger and the framework the passenger card can be used within, as well as an Instruction-Window, which provides and displays a set of help-functions to guide the cardholder through the steps of compiling and using the card data. The stored information includes, for example, the passenger's demographics data such as name, address, birth date, and telephone number; cardholder identification information such as a passenger ID number, SSN (Social Security Number), or check guarantee number; and an electronic representation of cardholder documents such as a driver's license, identity card, or passport. Also stored are the overall terms and conditions the passenger card has to conform to when being used, data and information about the card's eligibility for a particular itinerary or a specific application/ service, information about the card utilization including services rendered and travel performed via the passenger card, and the passenger's credit history including approvals or declines of card-based payment transactions or fund transfers. The stored background data elements comprise plain data that can be displayed and modified by all system users, restricted information that can be accessed or manipulated only by an authorized entity or by the cardholder, and certified data that can be retrieved and viewed but changed only by the certification center. Data and information can also be inputted into the background-field, including the instruction-window, after the passenger card is issued. For example, a cardholder can enter additional data, such as time management information to tailor the card for a particular card utilization purpose, or a issuer of card-based documents can update the document-related data, such as a license or an immunization pass with new information.

The TRAVEL OPTIONS field provides a plurality of transportation carriers and related services, as well as various payment means and card configurations, that can be selected or compiled and implemented via the passenger card. Based upon the selections, including consumptions triggered via the passenger card, this field can also be used to implement loyalty programs that let cardholders earn frequent traveler or shopper points for trips made with a particular transportation carrier or for purchases initiated at a particular merchant. The points, which will be stored in the passenger card, have value similar to cash and can be redeemed at carriers or merchants participating in such a program; for example, by initiating future trips/ purchases with the passenger card or by trading-in the points for cash. In this field is also incorporated an Instruction-Window, which guides the card user through the steps of selecting or using the transportation and service means and of compiling or inputting the payment account data and the card configurations. This window provides and displays instructions that describe the choices available for a particular task, recommendations about how to proceed, and consequences associated with a particular task or recommendation being selected. The window also explains the outcomes associated with a particular command or function being executed, as well as display the detailed information relating to the selected travel or admission tickets and to the utilized payment forms or card configurations data. The travel options field comprises the selection and payment sections.

The SELECTION TRANSPORT/SERVICE section allows the card user, including the system, to choose a particular transportation carrier from among the plurality of carriers, which facilitate appropriate travel means by air, sea and land; and select a specific service from among a menu of traveling services, which relate to goods and services provided via the passenger card. The transport-related data comprises, for example, the electronic representation of tickets for a particular itinerary, including the appropriate seat assignments and access rights, and the detailed information about the carrier to be used thereby, including the related type and identification of the carrier; as well as the itinerary to be followed and sites to be visited thereby, including the location, date and time of the corresponding departure(s) and arrival(s). The tickets can be identified via a unique ticket number, as well as via passenger-related information, such as name and address, or selected information about the carrier or itinerary, such as name of the travel agency or amount paid for the ticket. The passenger cards can store a single ticket or host a set of tickets for several passengers. The service-related data comprises, for example, a set of benefits data that entitle the passenger to specific rights or considerations upon presentation of the passenger card. Such benefits may include advanced seat reservations, selected upgrades, free admission to events, automated check-in and boarding capabilities, serving of special meals, purchase of discounted merchandise, as well as the accumulation of bonus points for frequent travel and selected purchases.

The above transport/service data can also be viewed and/or manipulated via the Scroll-Window. This window allows card users to browse through the list of carriers and services available to the passenger, display the related information, and make appropriate selections. For instance, the passenger can use the scroll bars to select a specific airline carrier, display the seating guide, and make a ticket/seat reservation. The passenger can also locate a particular ticket via the corresponding identification number, retrieve the information relating thereto, and make any necessary modifications. The reservations or modifications can be stored in the passenger card, including communicated to the appropriate system databases as well; a particular seat assignment that is reserved or changed via the passenger card, has to be validated by the transport provider's database. In other words, although the passenger card can be used to pre-select or change a particular seat assignment, including the type of carrier and date and location of departure/arrival, the card needs to forward the seating information to the provider database to have the seat assignment confirmed. For example, after compiling a request for an airplane ticket via the passenger card including an seating guide stored therein, the card will log-on to the airliner's seating map, including to any other remote databases networked thereto, communicate the ticketing request, and after receiving approval, store the electronic ticket in the passenger card. Only this map, including any database linked thereto, has the authority to make the final ticket reservation, including to accept new seating requests or to change previously made seat reservations.

The PAYMENT/CONFIGURATION section allows the card user, including the system, to manage the selection and usage of various payment forms and card types for the purpose of electronic payments and of card template configurations. The Status-Window can display the payment forms and card configurations, as well as facilitate the manipulation of selected payment information or card data. For instance, the window lets the card user locate and retrieve detailed information about the individual forms or specific configurations that are stored in the passenger card. Also communicated and displayed can be payment information or configuration data that is stored in and retrieved from a remote database and/or inputted by the card user. Once displayed, the data/information can be used as is, or edited and stored in the passenger card or communicated with remote databases for later on usage. The window also provides the most up-to-date status of the payment information and card data, as well as a history of data previously selected.

The electronic payment forms comprise payment options that represent currencies or other traditional paper/plastic-based banking cards via an electronic monetary value stored in the passenger card. Associated with these forms is a set of account information, such as the maximum debit/credit limit, effective and expiration dates, cumulative amount spent so far via that form, and the balance remaining in the card for further purchases. The forms can also simulate those traditional payment means while automating the authorization and clearing tasks via electronic data links to communicate with the appropriate transaction processors. The payment forms can further comprise promissory notes endorsed by a non-banking entity, such as the transport provider, and accepted by the service providers for the purchase of goods and services. For instance, such type of notes can represent electronic payment points that will be settled by the entity the way commercial banks clear payments made via their paper/plastic cards; the settlement occurs after the points have been forwarded by the provider that accepted such points as legal tender. The payment forms can be identified via a particular name, specific account number, or via any other unique identifier. If a particular payment form is used for a purchase, the card-based balance will be compared with the payment due for that purchase. If this remaining balance is equal to or greater than the due payment, the card-based payment form, including the stored monetary value, can be used to pay for the related merchandise or service. When approved by the cardholder, the payment due will be deducted from the remaining balance and forwarded to the merchant. If a card-based payment is used, the payment due will also be added to the cumulative spending amount which reduces the remaining balance accordingly; the cumulative spending amount is deducted from the maximum debit/credit limit to yield the remaining balance. If the payment due is more than the remaining balance, the selected payment form cannot be used for payment; the remaining balance has to be augmented or another payment means used. The remaining balance can be increased by reducing the cumulative spending amount and/or by increasing the maximum limit associated with that particular payment form. This can be achieved, for example, by the cardholder paying off at least a portion of the balance owed to a bank, and by the bank reducing in response thereto the spending amount accumulated in the card. Or, the bank can increase the credit/debit limit for that payment form, and store the higher maximum amount into the passenger card;

the increased amount will recharge the depleted amounts. The cardholder can also augment the remaining balance by transferring a monetary value from another payment form, or downloading some payment points, to increase the maximum amount or lower the cumulative spending amount stored in the card.

The card types comprise a plurality of card configuration templates, as well as electronic pointers and built-in communication links to those templates and to remote database information, that support the multi-application scenarios via a single passenger card. The templates provide the structure for the various card contents that are configured to specific application needs. Such a structure comprises, for example, the framework for a predetermined number and type of data elements, including the various formats and related contents for those data elements, that will be stored throughout a set of predefined data fields in the passenger card. Selected data elements can also be imprinted onto the card package. The knowledge-based pointers locate the card templates via a unique configuration number or application code, retrieve the template, and display the structure associated therewith, so as to allow the viewing and/or inputting of data. The data communication links allow the exchange of information between and among the card contents and remote system databases. To implement a multiple application scenario, the passenger card evokes a set of application-specific applets that are tailored to a particular application task. These applets are just-in-time software programs that are highly modular and machine-independent. In this way, these software applets are reusable and reconfigurable to serve new or multiple applications with the same passenger card. The applets can also be dispatched across a network of service providers, such as the Internet, and assembled dynamically on any point-of-service for a specific application, regardless of location or type of computing platform installed at those providers. Let's consider, for instance, a multicarrier passenger card that entitles the cardholder to use a predetermined number of transportation carriers for a particular itinerary or over a predefined time period. When presented for service, the passenger card will locate, retrieve and trigger the appropriate software applets to authenticate the card and to identify the cardholder, gain admission to the premises where those carriers are stationed, validate the boarding of the carriers, compile the necessary connections, and verify the time-related restrictions.

The data and information relating to the transportation carriers, travel services, payment forms, and card configurations can also be earmarked electronically (e.g. with identification numbers or security keys) by the underwriter of the card data, so that authentic data/information will be forwarded securely to the recipient. Such a recipient can comprise the travel center, any of the service providers, or the passenger card per se. A particular card data can also be protected via the recipient's identification number or security key (e.g. attached to the data), so as to allow the use of the communicated card data only by the entity intended to receive the data. For example, a bank attaches its identification number to a credit card payment form and encrypts the form with its security key. To make sure that only a particular cardholder can use the payment form, the bank might also capture biometrics information or enter a security key of that cardholder and attach the captured information or the inputted key to the payment form; to unlock the card-based payment form, the identical biometrics of correct key has to be provided. The passenger, when paying a merchant via the card-based form, might also attach the merchant's identification number or security key to the forwarded payment information; in this way, only that merchant, who can provide the matching number or correct key, can clear the payment.

The ACCESS CONTROL field authenticates the passenger card, verifies the cardholder, and protects access to certain information. This data field comprises authenticity codes to validate the passenger card, digital signatures to confirm the legitimate cardholder, and authorization codes to control access to data stored in the card or in a remote database. The field further comprises applicable copyright statements or any other disclaimer notices with regards to data stored in the passenger card or to information being communicated with the remote databases.

The authenticity code will be stored in the card, for example, as a tamper proof number that cannot be duplicated; the number is known only to the issuer or manufacturer of the passenger card. When presented for service, the card can be validated via this code by comparing the code against an authenticity file stored in the issuer database or by performing a self-test of the card-based code. If there is a match or successful test, the card is authentic; otherwise a forgery.

The purpose of the digital signature is to provide positive proof that passengers are who they say they are, similar to the name of persons as written by themselves. For instance, this signature is an electronic representation of a distinctive mark such as a digitized signature, or of a unique characteristics such as biometrics information, of that passenger. The signature can also comprise appropriate cryptographic keys used to indicate the identity of that passenger. To establish the cardholder's identity, the card-based signature will be compared with the "life" signature or biometrics provided by the passenger. If the comparison is successful, the cardholder is legitimate; otherwise a message will be conveyed that a positive identification could not be established. In the same context, a cardholder that can provide the appropriate cryptographic keys required to unlock/validate the card-based signature, is also considered as being legitimate.

The authorization codes safeguard access to data and information while monitoring and controlling access to selected card data fields, including specific data elements, as well as to predetermined databases, including remote data records. These codes correspond to a set of pre-defined authorization levels that are allocated to the cardholder or to any other entity that is using the card, or communicating data between the card and remote databases. For instance, entities attempting to retrieve (read) or manipulate (write) a particular card data, must be authorized to read data from or to write data into the card's data fields. Such an authorization may be achieved, for example, via a PIN or any other password-like information the entities have to provide before the read/write operations can be performed. For additional levels of protection, the identification number or security key of those entities can be certified with the appropriate authorization codes to yield appropriate access rights. To gain access, including being gable to communicate with the card or database, the entities must provide the proper number or matching key.

The COMMUNICATIONS field comprises the means to facilitate a secure communications exchange among and between the remote databases and the passenger card, as well as the means to safeguard data and information communicated or stored by the card user or system entities. To identify a particular card or database, a distinctive card number or unique address will be stored in the card or allocated to the database. Also stored in the card/database can be any other specific identifier that is distinctive or unique. A particular data element, which is stored in the card or database, can be located via the data field section or data record number, as well as via the corresponding data label or addressing pointer.

The Read/Write means refer to the retrieving of data from or the loading of data into the passenger card; the retrieved/ stored data can also be displayed onto the card. The Send/ Receive means refer to the uploading of card-based data to a remote database or the downloading of data from a remote database into the card. This exchange of data is implemented by selectively coupling the passenger card to the database(s) via a data communication link; the data can also be displayed onto the card or by a computer terminal connected to the data link. The Encrypt/Decrypt means refer to the compilation and employment of security keys to be attached to the communicated or stored information. Such keys can also be incorporated into a particular access code. For example, selected information or card data elements can be encrypted via a cryptographic key by the sender before being communicated to a particular entity, and decrypted via a cryptographic key only by that entity, which is authorized to receive the message/data. As an additional safeguard means, data stored in the card, as well as codes protecting access thereto, can also be scrambled or unscrambled via this means. For instance, once encrypted, the data or codes can be decrypted only by authorized users. The above cryptographic means can also be used by encoding or decoding functions that allow the related translation or conversion of information with respect to different data formats and different data contents; for example, from data elements with a particular structure to similar data elements containing a different structure, and vice versa; or from an information item containing a particular number of data elements to a similar item but with a different number of elements, and vice versa.

The CONFIRMATION field allows the transportation provider, or any other service provider, to confirm a particular reservation made, or to certify a specific service requested, via the passenger card. For example, a passenger purchasing an airplane ticket and reserving a car rental or a hotel room, can download the electronic ticket and reservation information with the corresponding confirmation numbers provided by the airline, rental agency or hotel. To further safeguard this confirmation process, the passenger's digital signature, which is stored in the card, can be exchanged automatically with the carrier/service provider's certificates, which are stored in the remote provider databases. Based upon this, the certificate allows each party in a transaction to confirm the identity of the other and serve as proof as to who requested a particular service, who committed to provide that service, and who forwarded the confirmation number. The exchanged certificates can, for example, be compared against a list of original certificates stored in a public database, and if there is a match, the identity of the parties is considered as being authenticated, including the confirmation numbers as being issued by the service providers. In the case the pair of certificates doesn't match, a message will be conveyed that no positive identity could be established. If scrambled with a particular key, the certificate can be unscrambled only with the matching key, including information that is unique to the certifying party. Being able to unscramble the certificate is not only proof that the party's identity is established, but also that any information endorsed with the certificate is authentic as well. The Instruction-Window provides additional details or instructions about how to compile or select and how to use the card's communications and security features.

The AUDIT TRAIL field stores a trail concerning the card's usage, including what data/ information was loaded into the card and exchanged with the other system entities. A typical trail comprises the date and the location the card was utilized at, the name and related information about the transportation carrier used activity performed, a description of the travel-related activity being implemented and service rendered, and additional comments and explanations relating to the travel itinerary or the services. This field also gathers marketing data about the passenger's traveling records and purchase patterns, including the number and type of trips performed and of goods or services purchased; as well as where, when and what carrier or payment form was used to travel or to pay for the goods and services. This marketing data is then forwarded to the appropriate system entities, including the service providers, for analysis.

The invention also includes a method of compiling the contents of the passenger card and of issuing the card to a legitimate cardholder; the card contents comprising a set of data elements that are also stored and maintained throughout the remote system databases. The method includes the steps of verifying the identity of the cardholder and of authenticating the card, storing cardholder data and system entity information in the card, selecting and loading electronic tickets and related travel information into the card, storing payment information and monetary values in the card, loading other passenger use rights and entitlements into the card, authenticating data and information stored in the card, protecting access to card data and database information, issuing the card to the legitimate cardholder, and establishing an appropriate audit trail.

The verification of the cardholder can be accomplished by checking conventional ID documents presented by the cardholder, verifying cardholder-related information stored in Government or other databases, or by providing security information that has to correspond to the security data stored in the card. If the verification process is successful, the cardholder is authorized to retrieve, manipulate, or store card data; as well as download, view, or upload database information. Upon positive identification, the cardholder can also use the passenger card for the rights stored in the card; for example, to edit selected card data or to download an electronic ticket. The card's authenticity can be verified by checking the card authenticity code stored in the passenger card, including by comparing the code against the authenticity file stored in the system database. If the code is valid including if there is a match, the passenger card can be used; otherwise, card service is denied.

The data and information relating to the cardholder or system entities will be stored in or retrieved from the passenger card via the card's computerized input/output means, including the card data templates, or via a computer terminal, including the write/read device and biometrics box. The cardholder data comprises demographics data, such as a passenger ID number or SSN; and security information, such as a PIN, biometrics characteristics, or cryptographic keys. Cardholder data can also include an admission permit that allows security and administrative personnel to board a transportation carrier or to access the surrounding premises, as well as a license for merchants that are authorized to sell goods and services at the premises where the carrier passes through or is stationed at; the permit or license can be used in lieu of a ticket to gain admission to the carrier or premises. System information comprises data, such as identification numbers and security keys, about the entities that interact and communicate with a passenger card. The card data can be inputted by a card or system user while being provided by the cardholder or captured from a media holding information to be stored in the card. The card data can also be downloaded from other system databases including transferred from another passenger card.

The tickets for transportation carriers and the entitlements for travel services can be selected from among a list of available carriers and services. Once a selection is made, a particular ticket/entitlement can be loaded into the passenger card as an electronic representation of the corresponding information; for example, as a boarding pass or a confirmed hotel reservation. Such information is tamper proof and can be downloaded only from the travel map, which coordinates the seat assignments, or from the reservation desk, which allocates the room numbers. The seat assignments stored in a particular card can nevertheless also be transferred into another passenger card without the need to communicate with the travel map or reservation desk per se: once transferred, the original seat assignments or initial reservation will be automatically cancelled in that particular card, so that no more than one valid ticket or room number will be in circulation. The selected seat assignments or reserved rooms can be displayed, checked for accuracy, cancelled, or replaced with new assignments or different accommodations. The admission or service rights facilitated via the passenger card can be of a physical nature, such as boarding a plane or paying for an in-flight movie, or represent a virtual tool to access goods and services from the convenience of a home, such as ordering travel services over the World-Wide-Web (WWW) infrastructure.

To pay for the travel tickets or the goods and services ordered and purchased by the passenger, an appropriate monetary value will be loaded into the passenger card. This value can be an electronic representation of traditional money, including paper/plastic-based payment forms endorsed by banks, as well as electronic payment points underwritten by non-financial institutions including the transportation provider. The electronic money can be inputted as digital cash into the passenger card. The banking payment forms can be scanned and digitized by a payment reader, which is coupled to the passenger card, or downloaded from the bank's database via the data communication link. The scanned or downloaded information is then stored in the passenger card as an electronic payment form with a monetary value associated thereto. The payment points, which are sold or provided to the passenger by the provider (s), can be loaded into the card via the card read/write device or via the data communication link from the provider's database. The stored digital cash, payment forms, and payment points can also be displayed onto the card template and verified or updated, if necessary.

Besides electronic tickets, a set of other rights, services or considerations can be compiled and stored in the passenger card as well. This set of data allows the passenger to trigger or to receive the stored entitlements upon presentation of the passenger card. The specific entitlements can be automatically loaded into the card during usage or during selection from among a menu of benefits offered to the cardholder by the service providers. For example, when used for connecting transportation carriers, the passenger card facilitates appropriate admission rights for the premises where the carriers pick-up the passengers. These admission permits are automatically compiled, including time stamped, and loaded into the passenger card at the point-of-exit and checked at the point-of-entry stations. The passenger card also provides services that are activated by the card-based information relating to a particular itinerary booked via the passenger card. Such services comprise, for example, complementary meals and drinks, selected reading materials, or free admissions to events and attractions. The passenger card lets the cardholder also accumulate frequent bonus points in consideration of traveling with a particular carrier over a predetermined distance, purchasing a certain amount of selected merchandise, or of consuming a predefined level of services via the passenger card. These points can be exchanged later on for a free trip or a reduced ticket price, used to buy a discounted merchandise, or applied as a co-payment for the rendering of selected services.

To ensure the authenticity, including integrity, of data stored in the passenger card and of information communicated between the card and remote databases, a set of pertinent information is stored in the card and/or databases, such as validation codes to electronically earmark the passenger entitlements or goods and services provided, identification numbers to identify the related items or entities, digital signatures to certify data and information being communicated, and security keys to guarantee the integrity of card data or database information. This pertinent information, which is associated with or related to the data needing authentication, is tamper proof and can be loaded into the card or database only by the entity that is responsible to provide authentic data or maintain the integrity thereof. If this information is scrambled, it can be unlocked only by the authorized entity, including via a proper key. For example, after successful unlocking, the authenticated card data will be retrieved from the passenger card, or downloaded from a database, and displayed onto the card or any computer terminal as legible data.

To protect access to selected card data or database information, a passenger or any other system entity can employ various protection schemes to safeguard the individual data elements. For example, cardholders can input their PIN or biometrics information into the passenger card, as well as scramble certain card data with appropriate security keys. System entities can, for example, control access to card data or database records via predefined access codes or various security keys. To gain access to the card data, the appropriate codes or keys have to be provided by the entity attempting to do so. The provided information has to match, or correlate to, the one stored in the card. The same methodology applies to data that is stored and protected in a database; authorization to retrieve/download and store/upload the database data is granted once the proper access information is provided. Copyright statements and other notices can also be stored as a deterrent to illegal activities.

After the card contents is compiled, the card, including data stored or modified therein, can be used by the passenger authorized to do so. The card will be issued to cardholders that have provided proper information identifying the cardholders, data validating the access rights, as well as adequate payment. The issued cards can be used by one cardholder or by any other cardholder who is also authorized to access and use the card data. For example, an individual passenger uses the card as an airline ticket, while a group of passengers uses the card as a host for all tickets that entitle them to a chartered bus ride.

The system databases including the passenger card will also store an audit trail about the card's usage including the editing of card data and the communication of information between and among the remote databases and the passenger card.

The invention further includes a method for authorizing the cardholder to use a particular transportation carrier based upon the electronic ticket and related admission rights stored in the passenger card. The method comprises the steps of authenticating the passenger card, identifying the cardholder, determining if the card-based ticket is valid, compiling and loading a boarding pass into the card, deciding if more information should be loaded into the card, implementing multiple access and exit scenarios to and from the carrier, and establishing an audit trail.

The passenger card can be authenticated via the control module of the passenger station. When presented for admission/boarding purposes, the control module will compare the authenticity code stored in the card against the authenticity file stored in a remote system database. The control module can also perform a self-test of the authenticity code; for example, by verifying the integrity of the code while running a routine that determines if the code is original and still conforming to the card issuer's specifications. If there is a discrepancy or a testing failure, the card will be retained and an appropriate warning message conveyed. If there is a match or a successful test, the card is established to be authentic and approved for further service, including to be used as an electronic ticket for admission or boarding purposes.

The cardholder's identity can be verified at the passenger station by a carrier/travel representative, including via selected information stored in the passenger card. For example, when presented for international travel, the card can provide the cardholder's certified picture that was previously stored in the card or imprinted onto the card package. The stations's control module can capture the physical appearance of the passenger presenting the card and compare it with the picture stored in the card per se. If there is a match, the passenger's identity is established; otherwise, a message conveyed that the comparison was not successful. In addition, authorized personnel can also verify the picture imprinted onto the card, as well as the passenger's demographics information stored in the card; a successful verification indicates that cardholders are who they say they are. The passenger's identity can also be verified via security data stored in the card and information provided by the cardholder. For example, if the provided information matches or correlates to the card-based data, the cardholder's identity is considered to be established implicitly; only the rightful cardholder could provide such information.

The validity of the electronic ticket stored in the passenger card can be determined by reading and verifying the ticket-related information, such as the ticket number, name of the transportation carrier, seat assignment, and date, time and location of departure or arrival. Upon coupling the card to the passenger station, this information can be viewed and checked, or compared against the corresponding data stored in a remote database. If there is an irregularity, such as a ticket number tampered with, erroneous seating information, obsolete date, wrong location, or different carrier, the passenger station will convey an appropriate warning message; no passage/boarding is allowed. If the verification is successful, the ticket price will be analyzed to determine if it falls into a regular or special pricing category. If a regular price was paid for the ticket, the passenger may proceed and board the carrier. If the ticket has a special price tag, the passenger station's control module calculates the price difference and conveys a message that the requirements authorizing the special ticket price need to be confirmed as being met. For example, a lower price paid by children or seniors, can be confirmed via the passengers' DOB data that is certified and stored in the passenger card, or by a photo ID presented by those passengers. The control module retrieves the DOB data, computes the passenger's age by subtracting this data from the date provided by the computer clock of the passenger station, and if the resulting age is less (for kids) or more (for seniors) than a predetermined age limits, approves access to the carrier. If the age requirements are not met, the passenger(s) must pay the appropriate price difference to gain access to the carrier. The actual age information can also be displayed, so as to be viewed by a human operator. In addition, a permit for a disabled person or a year-pass that is purchased at a discount price while allowing unlimited traveling via a particular transportation carrier, might be needing confirmation as well. The rightful cardholder can be verified, for example, by comparing biometrics information, which is certified and stored in the passenger card, against the person's "life" biometrics, which is provided by the cardholder claiming to be intended bearer. If the card-based biometrics matches the life biometrics, the ownership is confirmed and free or discounted travel granted. Also verified can be the expiration and effective date or other terms the card-based permit/pass has to conform to.

After the ticket-related data, including the pricing information, is verified and confirmed, the control module can compile an appropriate boarding pass. This pass includes the time, date, and location where access to the carrier was approved by the passenger station, as well as where admission to the premises was authorized. The pass also attaches an electronic receipt, including a ticket cancellation notice, to the card-based ticket to prevent repeated use of the carrier via the same ticket, unless the card-based ticket is authorized for multiple usage including use of more than one carrier. This receipt/notice will also be communicated with the transportation provider's database and compared, for example, against the overall capacity as well as the available seats of that carrier. If the cumulative number—as counted by the control module—of passengers that are admitted for boarding over a particular time frame reaches a predetermined number, a message will be conveyed about the carrier's maximum capacity being reached; additional access is denied. If more than one card-based seating assignment matches—as indicated via the provider's database—the same ticket issued for that carrier, a warning message about the existence of multiple tickets with the same seat assignment will be issued by the control module. A carrier representative has to solve this matter; for example, approve boarding and update the ticket with the correct seating information, or reimburse the double-ticketed passenger accordingly. As long as the carrier's capacity is not reached or a particular seat assignment not claimed yet by more than one card-based ticket, the boarding pass will be loaded into the passenger card and access to the carrier authorized. The pass will also update the database with the number of, and seating information about the, tickets being admitted. In this way, the database will be informed in real-time about the status of all tickets the moment they are used for access or admission purposes.

Additional information can be loaded into the passenger card by an authorized entity, such as the service providers or cardholder per se. For example, the transport provider can store in the card a number of travel points or information relating to promotional activities. Also stored can be security information including identification numbers of the system entities loading data into the passenger card. The cardholder can capture biometrics information and attach it to the boarding pass or admission stamp, so as to prevent the use of the ticket by unauthorized personnel. This additional information can be verified and used upon presentation of the passenger card for service; for example, for trade-in of points, validation of systems data, and verification of the rightful ticket-holder. Also stored in the card can be a permit or license for admission of security/maintenance personnel or merchants. Such individuals or entities don't need to present for access purposes a ticket with a valid seat assignment, but the corresponding permit or license stored in the card. The control module will verify the date, location, and carrier the permit or license are authorized for and if valid, repeat the methodology used for qualifying ticket holders for access. The difference is that instead of seat assignments, data about a particular permit/license will be compared against the provider's database list that contains all valid permits and licenses. If there is a match, access is allowed; otherwise denied.

After removing or decoupling the card form the passenger station, the cardholder can board the carrier, including gain admission to the premises where the carrier is stationed at. The passenger can also temporarily leave the carrier/premises, and return without having to purchase another travel ticket. The passenger can also use the same boarding pass to gain access to more than one carrier or premises; for instance, when using the same ticket for connections during a particular itinerary or for multiple use. To do so, the passenger card will be coupled to the control module installed at, or monitoring by, the exit gate. The module will check the boarding pass previously stored in the card and if valid, compile an appropriate exit stamp, or a transfer stamp in the case of connecting carriers. The module will now load the stamp(s) together with the time and location of exit, as well as identifying data and other information relating to the carrier, into the passenger card. The passenger decouples the card and exits the premises or departs from the carrier with the intent of returning or using another carrier. When presented at the entry gate within a predetermined time period, the exit/transfer stamp will be verified and if authentic, grant re-entry to the premises or access to the carrier. If the exit stamp is missing or determined to be invalid, free passage or access to the carrier will be denied. Passengers can also capture their biometrics information and attach it to the exit stamp, so that nobody else can use the passenger card for re-entry purposes. Biometrics can also be employed for re-entry if no boarding pass, including no seat assignments, is stored in the card; this would be the case of the maintenance/security personnel or on-site vendors who may frequently enter and exit the carrier/premises. By making the exit gate accessible only from the premises where the carrier is stationed at or passing through, only cardholders already on the premises can use the biometrics box installed at the exit gate. In other words, cardholders exiting through the gate can load their biometrics into the card via that biometrics box, but personnel arriving from the outside cannot. When storing biometrics information in the card, the control module at the exit gate will add a unique identification number to the captured biometrics; also attached will be the time and location of exit. In this way, the control module at the entrance gate will recognize via that identification number if the biometrics information was actually loaded into the card at the exit gate and if it relates to a particular carrier/premises. If affirmative, reentry is granted; otherwise, free admission is denied.

The remote system databases including the passenger card will also store an audit trail about the card usage, such as for admission and verification purposes, as well as data and information being communicated between the card and remote databases.

The invention further includes a method for using the passenger card to pay for the card-based ticket, as well as for goods and services provided by the service providers. The method includes the steps of verifying the card's authenticity, determining if the card-based payment is valid, computing and authorizing the purchase amount, deciding if additional verifications are required, compiling an electronic receipt, clearing payments made via the card, and establishing an audit trail.

Upon presentation for the purchase of a ticket at a transportation provider or of goods and services at a merchant location, the passenger card will be coupled to a payment database or a POS device. The card can now be verified by comparing the authenticity code stored in the card against the authenticity file stored in the database or provided by the POS device. If there is a discrepancy, an appropriate warning message will be conveyed. If there is a match, the card is authentic and approved for further service, including as an electronic payment means. The card can also be verified by any portable terminal while comparing the card-based authenticity code against an authenticity file stored in the portable terminal or while performing a self-test.

The validity of the electronic payment form stored in the card will be determined by verifying the related information including the monetary value associated therewith. The payment form including related information can be verified by providing the security information that is used by a bank or underwriter to protect the form. This information will be compared against, or correlated with, the corresponding data stored in the card. If there is a match/correlation, the form's validity is established; otherwise, the form is not authentic. For example, inputting the correct identification number or security key for the form, or providing the security data of the passenger who is authorized to use that form, will unlock the payment information and activate the monetary value attached thereto. This monetary value can be an electronic representation of traditional money, which is backed by a financial institution, or of payment points, which are underwritten by a non-banking entity, To pay for a particular purchase made via the card, the purchase amount will be computed and compared against the digital cash stored in the card. If there is enough cash, the purchase amount will be approved by the cardholder and deducted directly from the passenger card while updating the digital cash balance remaining in the card; no on-line authorization calls are necessary. The digital payment will then be forwarded to the transportation/service provider. The received payment will be verified, processed, and credited to the provider's account. If the passenger card simulates traditional payment means, the card can also initiate and implement the required authorization process while communicating with the financial entities authorized to approve such payments. Electronic payments received via a portable terminal, which is used by mobile vendors, can be transferred to the merchant database in real-time or as a cumulation of payments at a later time. The mobile vendor can then request clearance of the electronic payments, including the redemption of payment points, as traditional money.

The merchant or other service provider can perform additional verification steps with respect to the cardholder payment. For instance, if a personal electronic check was used for payment, the merchant can validate the cardholder's identity via a certified driver's license stored in the card, or via a traditional ID document presented by the cardholder. The merchant can verify the driver's license number and expiration date provided by the passenger card, or determine if the picture recorded onto the ID document matches the cardholder's appearance or the digital picture stored in the passenger card. If a payment was made via payment points stored in the card, the service provider might want to verify if the payment points are valid or if the non-financial entity backing those points is still in business. This can be accomplished by determining the authenticity of the card-based points or by communicating with the entity to have the payment points confirmed before accepting them as payment. Service providers accepting payment points might also want to verify if the points are used properly. For instance, payment points earmarked for an airline ticket shouldn't be used to pay for hotel reservations, and vice versa.

After successful verification and approval, the service provider accepting the payment made via the passenger card, will compile and load an electronic receipt into the card and related system databases. This receipt represents proof of payment received by providers and includes, for example, the time, location, and the type of merchandise delivered or service rendered, as well as the price paid therefor. The receipt can also comprise the identification number or security key of the provider to confirm the provider's identity or to protect the receipt's contents. The receipt further comprises the validation codes to authenticate the provided merchandise or rendered service.

Once forwarded via the passenger card, the monetary value can be credited to the service provider's account. If the card-based value represents traditional money, the network transaction processors will clear the payment, so that the financial institution can reimburse the provider accordingly. If electronic payment points were used for the purchase, the points will be forwarded to the non-financial institution who then reimburses the provider. In both cases, the service providers can be reimbursed with traditional money for purchases made via the card. The providers can also keep and re-use the received payments as digital cash. When uploading the electronic payment amounts for clearance, the service providers can also earmark the payments with a security key, so that proper identification and ownership is established with respect to the transferred funds. In this way, the cleared payment amounts can be deposited only to the account of those providers.

The service provider databases including the passenger card will also store an audit trail about the verification process, card-based payments performed between the passenger and providers, and information communicated between and among the remote databases including the passenger card.

The invention further comprises methods for implementing via the passenger card a plurality of application scenarios. The scenarios will be facilitated by a set of application codes that are allocated to a cardholder or a transportation carrier, as well as to any other entity or item the card will communicate with or refer to during the card's usage. The methods include the steps of storing application codes and related information in the passenger card; loading payment forms and monetary values into the card; correlating card data to a passenger, a specific application, or to remote database information; certifying data and information stored in the card; protecting access to card data and database information; issuing the card to the rightful cardholder; authenticating the card and verifying the cardholder requesting application rights; selecting and implementing a particular application; monitoring the conformity to the application rights, and establishing an audit trail.

A set of application codes and related information will be stored in the passenger card to qualify the passenger for the plurality of applications upon presentation of the card, including upon communication with remote databases. The codes define a particular application or use right the card is authorized for. For example, for the use of toll roads and bridges, trucking of goods and moving of vehicles via dedicated transportation carriers, or for the admission of vehicles to predefined premises, such as parking lots, national parks, or other recreational or educational sights. Card-based applications further comprises the tagging of luggage and correlating the luggage to the rightful passenger, or the identification and verification of passengers engaged in international travel. The related information supports the implementation of a particular application while providing the necessary data and information. The information comprises, for example, the terms and conditions the passenger card has to conform to, and the passenger's responsibilities; personal data, such as the cardholder's name, address, citizenship and driver's license; information about the vehicle, such as the registration slip and insurance status; data identifying the luggage, such as size, weight, destination, item number and ownership; information about the entities that provide and maintain the card-based infrastructure; or data relating to the card-based ticket used for travel purposes. Also stored will be application-specific card templates to be used during the implementation phase of the functional application scenarios.

The payment forms, including a monetary value, will be loaded into the passenger card, to pay for the privilege of using the card for a specific application and for expenses that are occurred during card usage. The forms are an electronic representation of paper/plastic-based payment means endorsed by banks. The monetary value represents electronic cash backed by banks or payment points underwritten by non-banking entities; both representations are accepted as legal tender for payment purposes. The electronic cash/points can be downloaded from a checking or savings account, or from any other remote payment database, upon proper identification is provided. The monetary value can also be inputted into the passenger card by an authorized representative. The stored payment forms and digital cash or payment points can also be displayed onto the card template, verified, and used as is or updated, if necessary.

To correlate card-based data to persons, applications and system entities, appropriate links and inter-dependencies have to be established, such as built-in pointers or relationships that are dynamically compiled during the card usage. For instance, the card-based demographics data field can be associated with the cardholder via the holder's name, social security number, or any other unique identifier; as well as the card-based driver's license via the license number. Applications data can be combined via card-based application codes into application modules or card templates that are needed for the execution of a particular application. For example, a ticket code or number for an airline ticket can store or retrieve the appropriate information about who travels when, where and on what airplane. Entity-related information stored in the card can be allocated to the entity that provides the appropriate identification number or security key. For example, the issuer of a car registration document can be identified via the registration number, or the name of the agency taking care of the luggage, can be retrieved from the card-based tag information. To locate, including retrieve or store, card data or database information, a label or address associated with the corresponding data element or record name can be used. The data and information can also be cross-referenced and manipulated via a graphical user interface that provides a link between the passenger and systems application. In this way, the card-based payment information can be accessed via an account number or via the electronic purse embedded in the passenger card.

Selected data and information that is stored in the card or remote database, as well as communicated between the card and remote databases, can be certified by an entity that is responsible to provide authentic data or maintain the integrity thereof. The certification process can employ, for example, the entity's digital signature to authenticate the data/information; if signed with such a signature, it is authentic. The certification process can also use a security key to make sure that the data was not tampered with during storage or communications; for example, being able to access/unscramble it via the security key is proof that the data content is still the original one.

Access to card data or database information is implemented via predetermined access codes or appropriate security keys. For example, cardholders can input their PIN or any other biometrics information into the passenger card, as well as scramble selected card data with a security key. System entities can store a unique access code in a remote database or scramble a database data record with a secret key. To gain access to the card or database, the matching PIN or biometrics, as well as the appropriate code, has to be provided by the individual or entity attempting to do so. To unscramble the card/database data, the appropriate key has to be provided. If the provided key matches or correlates to the stored key, the data can be retrieved and viewed or communicated; otherwise, the data cannot be accessed.

After compiling, certifying and protecting the card contents, the passenger card will be issued to passengers that are authorized to use the cards for at least one application. The card, including the application rights stored therein will be issued to the cardholders that have provided proper identification, proof of eligibility for the card-based applications, and adequate payment, if applicable. The issued cards can be used for a particular application over a predetermined time period, including for a predefined number of usage, or as long as a set of predefined conditions are met. For example, a card-based travel ticket can be valid for a few weeks, including for up to two trips, or a driver's license stored in the card can be used as long as the license is valid, including renewed by the DMV. In other words, the cards can be configured to allow the utilization of the cards on an one-time or repeated use basis, including without any restrictions or while conforming to conditions to be met after the card is issued. The cards can be issued to a particular cardholder or shared by cardholders who are authorized to access and use the individual card-based application modules. The former can be accomplished, for example, by personalizing the card with the card holder's personal and eligibility information, including loading the information into the appropriate card data fields in a relational database-like manner. The latter can be accomplished, for example, by allocating the appropriate application codes, which are stored in the card, to cardholders who can identify themselves via a unique data or any other ID-like information.

The passenger card can be authenticated via any read/write device installed at a point-of-application or via the control module coupled to a passenger station-like apparatus. For example, the authenticity code stored in the card can be compared against the authenticity file stored in a remote system database, as well as a self-test of the card-based authenticity code can be performed to verify the code's integrity. If there is a match or a successful test, the card is established to be authentic. If there is a discrepancy or a test failure, the card will be retained including an appropriate warning message conveyed. In addition to authenticating the passenger card, selected card data can be validated as well. This can be accomplished, for example, by providing the appropriate access codes or security keys to retrieve or unlock such data, as well as by verifying the digital signatures used to certify such data.

The cardholder can be verified by checking conventional ID documents presented by the cardholder, verifying cardholder-related information stored in Government or other databases, or by providing security information that has to correspond to the security data stored in the card. If the documents or database data checks out, or if the provided information matches or correlates to the card-based data, the cardholder's identity is established. After the card is authenticated and the cardholder identified, the card will verify or compile the data interdependencies and correlation links for the applications to be triggered via the card. This ensures that all resources and entities engaged into a particular application are qualified to participate in the implementation of that application.

The applications can be selected from among a menu of systems applications that are available to the passengers. The cardholder can, for example, input via a keyboard the corresponding applications code, point to such a code displayed onto a computer screen, or convey to the system a functional description of the application to be selected. The selection can be made also via a card-based application code upon coupling the passenger card to the system. To determine if the application request should be approved, the system will verify the cardbased code; for example, by checking if the code is authentic and if there is a viable application associated therewith. If the verification process is successful, the application can be implemented via that card; otherwise, no application can be triggered. To implement the above applications, a set of appropriate card templates can retrieve and display, as well as manipulate and communicate, card data and database information. This data/information can be viewed, modified, or used for decision logic means to determine the way the application shall be implemented. If additional information is required during the implementation phase, such information can be provided via the graphical user interface or communicated via remote databases.

To control the conformity to or violation of the card-based application rights, the passenger card will provide the necessary information and supporting evidence. For instance, the card can display a driver's license or registration document comprising the expiration dates and information about the licensee or ownership status. If a registration fee is not paid, the card or a traffic officer will be flagging the payment due. This status can be communicated also with the DMV's database, so as to follow-up on the actions to be taken; for example, to pay the fee or to issue a ticket.

The passenger card and remote databases will also store an audit trail about the data and information stored in the card, authentications and verifications implemented during the card usage, electronic payments performed via the card, and information communicated between and among the remote databases including the passenger card.

To better illustrate the above system and methods, let's use the passenger card as an electronic ticket for a travel itinerary comprising several carriers and destinations, a payment carrier including a monetary value for the purchase of goods and services, as well as a host for various application scenarios. Also, to guarantee a secure information exchange and to authenticate the card data or system information, a cryptography scheme based, for example, upon the public key technology can be implemented; all entities including individuals involved in the exchange or authentication of scrambled data will have an unique pair of keys, a public key known to everybody and a secret private key known only to a particular entity. The public key can include a certified, unique mailing address or public telephone number, and the private key a secret combination of alphanumeric characters or a biometrics characteristics of an individual. In this way, a sender can communicate secure messages to a receiver while encrypting the messages with the public key of that receiver prior to transmission. The transmitted message can be decrypted only by the corresponding private key of the receiver (e.g. addressee); only the addressee on the envelope can open the envelope and read the letter. Besides, any information encrypted with the private key of a sender can be decrypted only by the corresponding (e.g. sender's) public key; the letter signed via the private key is therefore authentic and was send by that sender.

The public key technology, including the related security protocols employed for communications, can also be used to store a public key certificate in the passenger card. The certificate is tamper proof, cannot be duplicated, and can be used to certify or authenticate data and information it is associated with. For example, a particular certification center can load such a certificate into the passenger card as a digital signature; the signature can be attached to a selected card data or associated with particular information stored at a remote location. Afterwards, the digital signature provided by the passenger card can be used to access and unscramble that certified data or information, so that the data/information can be retrieved or downloaded and displayed or printed-out in a plain or legible manner. The fact that the data/information could be accessed and unscrambled with the card-based certificate is proof that it was certified by that particular certification center; if access is denied, the certificate could be a fake or the data/information tampered with. The signature can also automatically "pop-up" when card data or remote information, which is certified via that signature, is retrieved and displayed. Once displayed, the signature can be compared against the official signature of the certification center; this can be done by uploading the signature to the center's database for comparison or by verifying the card-based signature against a list of valid signatures provided by that center. If the comparison/verification is successful, the signature is established to be valid, as well as the card data "signed" therewith to be certified. In the case the retrieved/displayed signature is scrambled, the signature can be verified by using the certification center's public key to unscramble it. If the signature can be deciphered via this public key, the data/information was indeed signed by that certification center; otherwise, the signature cannot be relied upon because it might be a fake. The public key certificate can also be used to confirm the identities of cardholders and service providers involved in card-based transactions. To allow each party in a transaction to confirm the identity of the other, the electronic certificate stored in the passenger card will be exchanged automatically with the digital certificate stored in the merchant database. In this way, the certificates can authenticate off-line payment transactions, support on-line debit transactions, or ensure that the communicated information including monetary values were not altered by an unauthorized entity before it is received by the merchant. The certificates can also proof that a passenger has indeed initiated a purchase request and forwarded the necessary payment, as well as that a merchant has received the payment and provided the product or service.

Let's start with a cardholder who is using the passenger card to plan and to implement a particular trip including the related travel applications. To aid the planning and implementation process, the cardholder will store in the passenger card a set of supporting data and information. This can be accomplished by coupling the card to a card station and by communicating with remote databases, so as to personalize the card contents for the corresponding applications. For instance, the cardholder can input into the card a set of personal data, such as name, mailing address, telephone number. Also stored in the card can be the card templates that are an electronic representation of the documents pertaining to the cardholder, such as the driver's license, car registration slip, insurance papers, and passport. These documents can be requested from the appropriate authorities, such as DMV office, insurance company and passport agency, and certified and downloaded into the card after proper identification is provided by the cardholder. For example, the cardholder provides proof of automobile insurance and adequate payment to the local DMV office, which in exchange, issues the registration slip for that automobile. This can be achieved by coupling the passenger card to the DMV's database; communicating the card-based insurance information, including the demographics information of the automobile owner's; uploading the adequate payment data, including deducting the payment from the card-based monetary value; verifying the communicated information and uploaded data, including the identity of the cardholder and authenticity of the electronic payment; and certifying and downloading the car registration slip by the DMV, including storing it into the passenger card. Further stored in the card can be electronic payment forms including a monetary value. The cardholder will communicate, for example, with the bank and download into the card the electronic representation of a banking credit card, as well as an amount of electronic money from a checking account. The card-based credit card form and digital cash will be certified and downloaded by the bank upon request when proper identification is provided by the cardholder. The cardholder requesting the storage of documents or payment forms in the passenger card can be verified via several means. For example, by providing a particular biometrics information, or any other unique information, that matches or correlates to the one on record at those authorities. The identity can also be established by scanning an official ID document and comparing the scanned information against information stored in a remote database or loaded into the passenger card by a certified entity. The provided/scanned information can be verified via computerized means and/or by a human operator. After the card contents is compiled, the cardholder can choose the exterior "looks" of the passenger card; for example, imprint a particular graphics and text onto the package. The passenger card is now ready for further use. For instance, the cardholder presents or remotely couples the passenger card to a travel center-like setting to explore alternative transportation means and other services needed during the planned itinerary, to make and pay for the appropriate selections, and to load the ticket reservations and related information into the card. The planned trip requires an airline ticket, a hotel reservation, and a rental car. The cardholder will commence a dialogue with the travel center's database while retrieving and displaying the travel map.

To select the return-trip airline ticket, the cardholder will input, or point and click onto the map, the date(s) and location(s) of departure/arrival, as well as the number and type of tickets needed. In response thereto, the map compiles and provides a set of possible airlines and alternative itineraries, including the ticket price and the departure and arrival times associated with the individual airlines and alternative routes. Should the flight require any connections, the map will make additional recommendations and provide the necessary information, including the type of carriers and time and location of transfer. The map also displays any in-flight or other services available in connection with a particular airline ticket. The cardholder now selects a particular airline for the planned flight segment. The map will retrieve the airplane's seating guide while displaying the floor plan including the status of seats that are still available on that flight. Once a particular seating arrangement is selected by the cardholder, the map will display the required payment for that seat. The cardholder will pay for the ticket via the card-based credit card form and the map will update the airplane's seating map accordingly, as well as issue an electronic receipt for the payment received. The cardholder can also select a particular service, such as the serving of a special meal or the accumulation of frequent mileage points, which is provided by the airliner. The selected seat assignment/service, including the related application codes and other information, can now be stored in the passenger card, as well communicated with the airliner's database. If applicable, the airliner can also attach its digital signature to the card-based ticket/service to guarantee the authenticity thereof. The ticket-related information can also be provided as a hardcopy or imprinted onto the card package.

To select the hotel and rental car reservations, the cardholder can choose from among a list of options provided via the travel map, or input any other selection via the graphical user interface. The cardholder makes a particular entry and commits to the payment requirement associated therewith; for example, via the card-based credit card template. In response to the entry made, the selected hotel or car agency will confirm the appropriate reservation; by downloading the corresponding confirmation number into the passenger card. Also downloaded can be additional information, such as a map with directions about how to get there or other services provided by the hotel/rental car agency. In the case of frequent mileage points to be earned, the appropriate points will be computed for the hotel room or car used by the cardholder. These points can also be stored in the passenger card, but need to be confirmed upon check-out from the hotel or return of the rental car. Also stored in the card will be the appropriate application codes and other data about the hotel accommodations and the rental car arrangements. The cardholder is now set to commence the trip.

As the day of departure arrives, the cardholder drives to the airport to catch the reserved flight. On the way there, the cardholder has to cross a toll bridge. The passenger card will be presented to the toll both operator, including coupled to the control module regulating the access to the bridge. The control module will calculate the necessary fare based upon the type of car and/or number of passengers in the car; such information can be captured via a camera and weight station installed at the both, or inputted by the booth operator. The computed fare will be deducted from the card-based electronic purse and forwarded to the entity administering the bridge usage. Upon receipt of payment, the entity will load an electronic receipt into the passenger card and approve passage of the car. The cardholder will cross the bridge and after arrival at the airport, park the car in the long-term parking section. The card will be inserted into, including coupled to, the control module installed at the entrance to the parking lot. The control module will compile and store a parking stamp, including the time of arrival, in the card. Additional information can also be retrieved from the card or provided by the control module and included into the parking stamp. Such information comprises, for example, the car's registration slip including the license number, the airline ticket including the ticket number, or the positioning coordinates the car is parked at. These parking coordinates relate to the parking lot's layout map that is stored in the parking database; the map can also be loaded via the control module into the passenger card. The cardholder will now remove/decouple the card, board the shuttle bus, and proceed to the check-in counter.

Upon arrival at the check-in counter, the passenger hands the card to the airline representative who couples the card to the system for verification purposes. The system control module will verify the ticket related information, including the ticket's authenticity and time of departure. This can be accomplished by checking the digital signature of the airliner attached to the ticket at the time of purchase, and by comparing the day and time provided by the systems clock against the departure day/time retrieved from the card. If the signature checks out and the timing information matches, the ticket is established as being valid; otherwise, a new ticket has to be used. Because this is an international travel, the passenger's passport will be verified as well. The passport will be retrieved from the passenger card and viewed on the control module's display screen. The representative can verify the displayed information as is, or might request additional information to further verify the lawful bearer; for example, the signature of the passenger to be entered via a signature pad. If such information matches the one stored in the card-based passport, the passenger is considered to be identical with the passport bearer and authorized for boarding purposes; otherwise, access to the plane might be denied. After successful verification, the system compiles and loads the boarding pass into the card, as well as cancels the ticket portion, which is related to the flight segment(s) the passenger has been qualified for. The boarding pass can also be printed-out as a hardcopy.

Next, the passenger will be asked about eventual luggage items that need to be checked-in. The representative will weight the luggage and determine the number of allowable items, as well as compile a tag to be attached to the luggage items or program a identity label that is embedded in the luggage per se. The tag/label comprises the information, such as a bar code or any other plain or encoded data, that identifies the passenger as owner of that luggage, as well as the destination the item needs to be transported to. The tag-related information will also be loaded into the passenger card and attached to the card-based ticket as an electronic proof about what luggage has been checked-in and who the rightful owner is. The information will further be communicated with the system database of the airplane, so as to maintain the status of all luggage being checked-in for a particular flight. This database information also allows, prior to take-off, the matching of all luggage items against the passengers that actually have boarded the plane. The passenger can now proceed to the control module, which monitors the access of passengers to the plane, to couple the card thereto for the purpose of boarding the plane. The control module will verify the boarding pass, and if successful, communicate to the system database that a particular passenger has actually boarded the plane. The database can monitor in this way the seating capacity of the plane, including signal when the plane is full. If the boarding pass does not check out, boarding will be denied.

In the meantime, the tagged luggage will be directed to the cargo hold of the airplane; for example, as indicated by a tag-reading means, which can include a scanning device or wireless sensor, installed at the conveyer belt that the luggage passes by. The information retrieved from the tag will also be stored in the system database, so as to compile the status, including number and type, of luggage being loaded into the cargo hold. The arriving luggage items can be stored on a first-come-first-load basis or grouped by type, or by any other characteristic, of luggage; for example, all luggage items belonging to the same passenger can be stored adjacently in the cargo hold. The database information will also be correlated to the location a particular luggage item is physically placed within the cargo hold. This can be done, for example, by loading the layout map of the cargo hold into the system database and by marking the luggage location(s) thereunto. In this way, a particular luggage can be located or removed in response to inputting into the system database information about the corresponding tag or the related ticket. In other words, prior to take-off, the luggage items stored in the cargo hold can be matched against the passengers who have boarded the plane. This matching can be accomplished by comparing the information, including ticket and tag-related data, that was stored in the system database during the pre-flight check-in process with information, including cardholder and luggage-related data, that is stored in the database during the process of boarding passengers and loading luggage items into the cargo hold. As an outcome of the comparison process, a confirmation or warning message will be conveyed by the system, so as to allow the implementation of appropriate actions, including corrective actions. A successful, one-to-one match means that all luggage, which was checked-in by the passengers, is accounted for and that all of those passengers are on the plane as well. A discrepancy means that either a certain luggage item or a particular passenger cannot be accounted for or is missing. For instance, a luggage identified as being checked-in and loaded into the cargo hold, but not matched with any of the passengers that have boarded the plane, needs to be investigated. The luggage could be the item belonging to a harmless passenger who didn't board yet, but also a bomb checked-in by a terrorist who did not board the plane. If the missing passenger is found, the appropriate boarding pass will be coupled to the control module to determine if the database comparison will now yield a match, and if successful, the plane can take off; otherwise further investigations are needed. In the case of a suspect luggage, the item will be pinpointed and displayed onto the layout map of the cargo hold, inspected and/or removed by security personnel; the plane may leave without or with the luggage. On the other hand, the case of a passenger that checked-in with a luggage, but with no luggage being loaded into the cargo hold, needs investigation too. The missing luggage item needs to be traced to see if it still is on the conveyer belt, if it was directed somewhere else, or if it is lost. If the item is found and loaded into the cargo hold, the plane can take off; otherwise a decision has to be made about appropriate actions to be taken before the plane takes off.

The above process of checking-in, tagging the luggage, and issuing a boarding pass by an airline representative can also be accomplished automatically via the card's built-in computerized means, while coupling the card to the passenger station-like apparatus and communicating with the airliner's system database. After this process is successfully accomplished, the plane will take off and facilitate in-flight services, if any, to the passenger; for example, the serving of special meals. The passenger can communicate to the isle booth, which coordinates the distribution of meal servings, the seat number such a meal should be delivered to. This can be done by inserting or coupling the card into a card slot or to a transmitter that is connected to the booth's receiver unit. In this way, the card-based seat location and type of food will be communicated to the distribution center of the meals. The seat location, the special meal should be delivered to, can also be projected automatically onto a seating map display installed in the both; the seating information being retrieved from the airliner's database that checked-in the passenger, and read the card-based application code indicating the special meal item to be served for a particular passenger.

Upon arrival at the destination, the passenger proceeds to the baggage claim to pick-up the luggage items that have been previously checked-in. The passenger removes the luggage, as identified by the tag affixed to the luggage, from the conveyer belt and proceeds to the exit gate while coupling the passenger card to the control module installed at that gate. To establish proper ownership of the luggage, the control module will read the tag-based data and compares the data with the tag-related information that was stored in the passenger card during the check-in process. If there is a match, the passenger can exit with the identified luggage items and the control module will update the airliner's database accordingly. In this way, the database will also establish proof that the airliner did not loose any luggage and that the passenger actually removed the luggage. If there is a discrepancy, a message will be conveyed that the passenger card does not contain tagging information that matches the tag on the luggage. An alarm may sound and/or the exit gate may block passage of individuals trying to remove luggage items not belonging to them. To further validate the ownership of luggage items, additional verification steps might be necessary. For instance, if the control module detects a biometrics information being associated with the tag-related data or information, the passenger must provide the matching "life" biometrics to establish proper ownership. If the provided biometrics does not match the biometrics information previously stored in the passenger card and/or attached to the tag, the control module will convey an appropriate warning message.

To improve the effectiveness of the baggage claim operations, the invention further provides a means for pinpointing, sorting and transporting the luggage items more efficiently onto the carousel. This will be achieved, for example, by installing a claim box the passengers can couple their card to, and a baggage sorter module the luggage items retrieved from the cargo hold will pass by. The claim box reads the tag-related information stored in the card and communicates the information to the sorter module. In response thereto, the sorter module places the luggage, which is identified by the tag that matches the communicated information, onto the carousel, so as to allow the luggage items to be available on a first-come-first-serve basis. Besides, if more than one item belongs to a passenger, the items can be transported unto the carrousel as a group of items as compared to individual items arriving at different time periods. Passengers arriving to pick-up their luggage can also couple their card to the airliner's system database to let the database inform the sorter module which luggage to retrieve, including the number and order thereof. In response thereto, the sorter module will scan the tags affixed onto the luggage items, and automatically load the items onto the carousel belt. The sorter can also display the tag-related information, including the order the luggage should be transported to the baggage claim area, so as to allow a luggage handler to do the actual loading.

The passenger removes the luggage item(s) from the carousel, exits from the baggage claim, and proceeds to the rental car agency to pick-up the car that was reserved via the passenger card. The agency representative couples the card, for example, via a card terminal or wireless means, to the database of the rental car provider's system, so as to verify the cardholder's eligibility and the car's availability. The system/representative will verify the confirmation number stored in the passenger card and compare it with the confirmation information stored in the rental car database. If there is a match, the system will retrieve and compile the contractual document that allows the passenger to drive a particular rental car. This can be achieved by automatically inputting into the document the appropriate data and information from the database or the passenger card; for example, the make/model and license number of the rental car, or the passenger's personal data and the information relating to the driver's license. Also retrieved from the passenger card can be the credit card account number for the purpose of waiving certain insurance clauses. If applicable, the card-based driver's license can be verified as well; for example, by displaying onto a computer screen the electronic picture associated therewith, or by communicating the license number to the DMV database for further verification. If the picture matches the physical appearance of the cardholder, or the card-based data correlates to the DMV database information, the driver's license is established as being authentic. The driver's license can also be authenticated via the DMV's digital signature, if such a signature is attached to the license. Also inputted into the contract-template can be additional terms and conditions, such as the number of days or miles the car can be driven for, as well as the drop-off location for the rental car. The passenger can now sign, for example, via a signature pad, the contract; the contractual document can be stored in the passenger card and/or printed out as a hardcopy. Also loaded into the passenger card can be an electronic key for the car identified via the license number stored in the contract, a layout of the lot the rental car is parked at, or a street map of the surroundings. The card-based key can be used, for example, to open the door or to start the ignition of the rental car at the date specified in the contract. This can be accomplished by installing or coupling a control module to the door lock or ignition system. The control module reads the card-based key and contract, and compares the license number and date included therein with the license number of the car provided by the control module and the date provided by the system clock. If there is a match, or date compliance, the door can be opened or the car be started. The passenger can also display onto the card the parking lot to pinpoint the car's location in response to inputting the car's license number, or the street map to communicate with the car and/or a provider of GPS (Global Positioning System) services when driving on the freeway.

The passenger leaves the rental car premises and heads towards the hotel while inputting into the GPS system the destination and request for positioning. As a response thereto, the GPS determines and lays out onto the street map the positioning coordinates of the car and possible routes leading to that destination. The GPS capability can also compile a dynamic track, including velocity and time, of the car as it moves on the freeway. This mobile track can be displayed onto the passenger card or a display mounted within the car, while illustrating any deviation from the directions that are recommended by the card-based street map. Upon arrival at the hotel, the passenger presents the passenger card to the registration desk. The card will be coupled to the hotel's database and a verification process, similar to the one performed at the rental car place, will be accomplished. For instance, the card-based confirmation number verified against the number stored in the database, card-based data and other information automatically retrieved and inputted into a registration slip, the stay at the hotel backed-up by the credit card form stored in the passenger card and by the digital signature provided by the cardholder, and appropriate data loaded into the passenger card or provided as a hardcopy. As a result, the hotel accommodation will be validated and stored in the passenger card as the appropriate room number and applicable time period. In this way, the passenger card can be used as an electronic key to gain access to that hotel room. This can be accomplished by installing at the entrance to the hotel room a control module that reads the card-based access key. The control module verifies the card-based room number and date(s) associated therewith. If the number and date match the room number and the date provided by the control module and the system clock, the door can be opened; otherwise, a warning message will be conveyed that the room number is wrong and/or accommodation is expired and no access can be granted.

After settling in to the room, the passenger decides to do some sight-seeing while driving to a national park located nearby. On the highway, the passenger will be stopped by a traffic officer for a speeding violation. The officer states the reason for stopping the car and requests to see some documents, such as the driver's license, registration slip/rental contract, and proof of insurance. The driver presents the passenger card, which contains those documents, and to view or verify this card data, the data can be retrieved and displayed, as well as communicated and compared against information stored in a remote database. The traffic officer can verify the displayed information or upload it for comparison with a remote database, and proceed accordingly. For example, the driver's license or other documents can be displayed within a card-based template(s) and viewed by the traffic officer. In this way, the displayed picture of the driver can be verified against the physical appearance of the cardholder, as well as the text of the rental agreement or insurance document read by the officer. The card can also be coupled to the officer's laptop, or to any other remote system database, for further verification purposes. For example, the officer can cross-check the contents of the documents with the database(s) of the DMV office, rental agency, or insurance provider. In this way, the driver's license number can be checked against a list of valid license numbers maintained by the DMV, the rental agreement can be compared against a list of contracts maintained by the rental agency, and the policy number plus expiration date and related coverage information can be verified against a list of policy holders maintained by the automobile insurer. If there are some problems with the documents, appropriate actions will be taken; for example, if the driver's license is expired or suspended, the officer will cancel the card-based driver's license and issue a ticket for driving without a valid license, as well as communicate the implemented measures to the DMV database. If the card-based documents are in order, the officer will compile the speeding ticket. This can be done by selecting the related ticket template from among a list of predefined templates stored in the laptop/system database and displaying the template onto the laptop. The ticket can be filled-out, for example, by automatically retrieving from the passenger card, and electronically inputting into the template, information that relates to the driver and rental car. The officer can also input additional information, such as the badge ID number, date of required court appearance, or any other data about the circumstances relating to the traffic violation. The driver will now sign the ticket; for example, via a signature pad coupled to the laptop. The ticket, including ticket number, can be stored in the passenger card or printed-out as a hardcopy. The ticket information will also be communicated with the database(s) of the DMV and county clerk's office for further processing and follow-up purposes. For instance, if the passenger card will be coupled later on to the clerk's database to pay the speeding fine, the database will retrieve the card-based ticket number and look-up the data record referenced by the ticket number. Based upon that record, the database will determine the payment due or any other terms, such as the date of a court appearance, that relate to the speeding ticket. Once adequate payment is provided, for example, via the card-based monetary value, the clerk's database will inform all appropriate entities, such as the DMV office or insurance agencies, about the status of that particular case. In addition, the clerk's database will also be updated to consider the case closed and to load an electronic confirmation thereabout into the passenger card. The passenger proceeds to the national park and upon arrival, couples the passenger card to the control module installed at the entrance to the park. The module will read the card-based data or scan the car to determine the type of car and number of passengers in the car. Based upon the findings, the module will determine the entrance fee; for example, a fixed fee per passenger car plus an incremental fee per each passenger. A park ranger can also instruct the module to download the map and view points of the park into the passenger card; such information can be displayed later onto a card template and used by the park-visitor for orientation purposes. The passenger uses the card-based monetary value to pay for the admission fee and enters the park.

The next day, the passenger decides to visit one of the surrounding cities and to use the public transportation means available throughout the city. The passenger stops at the city's information center and couples the card to a travel map to compile a particular trip. For instance, the passenger points and clicks onto the departure and destination locations, which are displayed on the map, enters the number of tickets requested, and selects the date/time the tickets should be valid for. In response thereto, the map determines the transportation carriers required for the trip, including necessary connections, and computes the price of the round-trip ticket. The passenger confirms the trip compiled by the map, or explores alternative routes, and pays for the ticket (s). Upon adequate payment being received, the map will store the electronic ticket, including the use rights for the carriers and connecting travel segments, into the passenger card. Also downloaded into the passenger card can be the street map of the city, including points of interest or a restaurant guide. The passenger card is now ready to be used accordingly; for instance, on a bus, street car and a ferry, as well as for all-day rides on the subway. To board the transportation carriers, the passenger will couple the card to the control module(s) of the passenger station-like fixture that monitors access to and exit from the carriers. For example, to board the bus, the control module (at the entrance door) reads the card-based ticket, and in response thereto, compiles and stores the related admission stamp in the passenger card, and grants access to the bus; the ticket portion for the bus ride will be cancelled. When leaving the bus to continue the trip via the street car, the control module (at the exit door) will read the card-based ticket and bus-admission stamp, and in response thereto, compile and store a related exit stamp into the passenger card. To board the street car, the control module (at the entrance door) will read the card-based data, compile and load into the passenger card an admission stamp for the use of the street car; the admission stamp for the bus will be cancelled. To continue on the ferry boat, the previous methodology of using the passenger card for connecting carriers will be repeated. On the other hand, to facilitate the multiple rides on the subway, the control module will compile and store a master-admission stamp in the passenger card. This stamp can be valid for a predefined section of the subway network, as well as for a predetermined time period. When transferring from one subway vehicle to another, the control module at the corresponding entrance gates will read the master-admission stamp and automatically compile and store the related slave-admission stamps in the passenger card. These latter stamps allow access to the connecting vehicles as identified by the master-stamp, including for the time period as specified by the cardbased ticket. After the one-day tour is over, the passenger decides to spent the next few days to visit more points of interest located throughout the city. To plan those additional trips, the passenger will input into the card the places to be visited, as well as the related dates and times. The planning process can be accomplished by retrieving and displaying the card-based street map, selecting on the map the points of interest, as well as by compiling and inputting into the card the schedule concerning those future trips. The schedule will comprise the name and location of those places, as well as the time-stamps associated with the planned trips. In this way, the card-based schedule provides the guiding support and time management functions for the trips to come. For example, the card will indicate the positioning coordinates of the passenger and of the places to be visited while also flagging the location "next-in-line" or any deviations from the planned itinerary. The card-based schedule will also display, or convey to the cardholder, the date/time of the upcoming point of visit while also reminding the passenger about how much time is needed to get there. For example, the system determines the distance between the passenger's positioning coordinates and those of the place to be visited next, and in response thereto, computes the time needed to get there as a function of the transportation means available to the passenger. This required time will be compared against the actual amount of time available to the cardholder for reaching the scheduled destination; the available time will be calculated by subtracting the card/system clock from the timing data stored in the card-based schedule. Based upon this comparison, the card/system will advice the passenger about when to leave the present location, how fast to drive, or what other transportation carrier would be most appropriate to take, to reach the destination in time.

As departure time arrives, the passenger will check-out from the hotel, return the rental car, and board the plane. The bills for the hotel/car can also be paid via the passenger card. For instance, by coupling the card to the hotel's database to retrieve the bill as identified via the card-based room number. The electronic bill will be downloaded into and displayed onto a card-based template while showing the itemized charges and date(s) of occurrence. After forwarding the appropriate payment, for example, by deducting the amount due from the card-based monetary value, the hotel will compile and load an electronic receipt into the passenger card. In addition, the card-based key will be erased to prevent further access to any of the hotel's room. When dropping-off the rental car, the card will be coupled to the rental car agency's database to compile the bill as related to the card-based contract number, including the driver's name.

The amount due by the passenger is a function of the contractual agreement and of the actual car utilization (e.g., number of days, mileage driven, or amount of gas left in the tank). The electronic bill will be downloaded into and displayed onto a card-based template while showing the amount and date of expenses incurred. After adequate payment is provided, an electronic receipt will be loaded into the passenger card, as well as the card-based key, which was used to open the car's door or to start the ignition, deleted. If enrolled into a frequent travel program, the passenger card will be credited with the corresponding bonus points in exchange for staying at the hotel and driving the rental car.

When arriving at the airport, the methodology used previously to check-in the passenger will be repeated; for example, the passenger identified, the card-based ticket verified, and the luggage loaded onto the plane. The passenger boards the plane and enjoys the flight home. As landing time nears, the immigration/custom form needs to be filled out. This can be done via the passenger card by displaying the form onto a card-based template; the form can be stored in the passenger card or in any other mobile terminal, including downloaded from the airliner's database or scanned from a hardcopy. The template will retrieve selected information, which was previously stored in data fields of the passenger card, and automatically load the information into the form-template. Such information comprises the passenger's name, residence, and citizenship, as well as flight-related data including the airline's name, flight number and location/country of takeoff. The template will also facilitate the inputting of additional data by the passenger per se. For instance, a description of items to be declared or a note that none of such items are present, or a statement about the nature of the trip or the length of stay. After the form is filled-out, the passenger will sign it via a signature pad, or any other handwriting recognition means, and store the form in the passenger card; the form can also be printed out as a hardcopy.

After landing at the international airport, the passenger proceeds to the immigration/customs booths for clearance. The passenger card will be coupled to the control module monitoring passage through those booths and in response thereto, the control module will verify the passport and customs form that are stored in the card. For example, the module will retrieve and display the passenger's citizenship information and picture; this information can be analyzed, including compared against the physical appearance of the passenger. The module can also cross-check the passport data against Government databases, so as to detect any outstanding warrants, individuals convicted or suspected of criminal activities, cardholders who match the profile of possible drug traffickers, or any passenger that should be investigated before admittance is allowed. In the case a passenger is suspected of wrong doings and an appropriate court order is issued, the control module can sound a silent alarm or load an electronic tracer into the passenger card. This tracer can be pinpointed and intercepted by law enforcement agents that are in charge of surveillance for that particular passenger. Similar to the passport-related data, the information stored in the customs form can be verified as well. For example, the control module can retrieve and display the form onto the card template and allow the customs agent to evaluate the inputted data. The agent can also communicate with remote databases to determine if the form-based information justifies any follow-up or further investigation. For example, passengers with a history of trying to smuggle foreign agricultural items or import animals on the endangered species list, might be scrutinized more closely to see if any laws are violated or quarantine measures are applicable. After the immigration/custom checks are accomplished, an appropriate "approval" stamp can be stored in the card while clearing the passenger for passage.

The electronic documents and forms stored in the passenger card can further automate the method of admitting or rejecting the passengers. For instance, upon arrival for clearance the passengers will be instructed to first choose one of the gates marked with a "US citizens" or "legal residence/green cards" or "aliens" sign. The passengers will select and pass through a particular gate while coupling the passenger card to the control module that monitors the passenger flow through that particular gate. The control module will read the cardbased information, comprising the personal data, airline ticket/boarding pass, passport, and immigration form. In response thereto, the module can automatically verify the card-based data, as well as communicate in real-time with remote databases to compare selected card data against information maintained by the Government or by international law enforcement agencies. As an outcome of the verification step, the control module directs the passenger flow accordingly; for example, via a green (01) light signaling to proceed to the exit, via a yellow light (02) indicating to provide additional information, or via a red light (03) to stop and pass through a different gate marked with a "INS-Agent" sign. Passengers, who are cautioned with a yellow light, might be required to provide a particular biometrics information to the control module; for example, their fingerprints to be captured for comparison with biometrics information stored in a remote database, or their "life" picture to be scanned for examination by an agent stationed at a remote location. Next, the passenger proceeds to the baggage claim to pick-up the luggage items while claiming the items that match the card-based luggage tag(s). To exit with the luggage, the passenger is instructed to choose one of the gates marked with the "to declare" or "nothing to declare" sign, as well as couple the passenger card to the appropriate control module. The verification method described above will be repeated, including the card-based customs form verified. As a function of the verification process, the passengers will be directed via a green or yellow light to proceed, or via a red light to stop by at a gate marked with the "Customs-Agent" sign.

After successful clearing, the passenger will proceed via the airport shuttle to the long-term parking lot. To locate the space the passenger's car is parked at, the passenger can input the car's license number and in response thereto, the card will display the car's location onto the parking lot map, which was previously stored in the card. The passenger card can also be coupled to the control module of the parking lot. The module will read the parking stamp, which was previously stored in the passenger card, retrieve the positioning coordinates associated therewith, and display the corresponding location of the car. To exit the parking lot, the control module at the exit gate will read and verify the card-based parking stamp, determine the applicable parking fee and display the amount due. The fee is a function of the number of days/hours the car was parked. This number will be computed by subtracting the date/time of arrival, which was stored in the card-based parking stamp, from the date/time of exit, which is provided by the system clock. The passenger pays via the card-based monetary value, and in response thereto, the control module loads an appropriate receipt into the card and opens the exit ramp. The passenger exits the parking lot and drives home.

As time goes by, the passenger realizes that the card-based passport needs to be renewed and decides to renew it remotely via the following method; the method described below can also be applied for the remote renewal or issuance of any other ID document, license, or permit-like document that is endorsed by an authorized entity.

The passenger will display the card-based template representing the passport application form while inputting the necessary data; the form-template can be stored in the passenger card or downloaded from a remote database. The data entries comprise demographics information, such as name, permanent and mailing address, telephone number, and SSN; as well as additional personal data, such as gender, date and place of birth, height, and hair and eye color. Also included is information about travel plans and an emergency contact, as well as data related to the most recent passport, such as passport number, and date and place of issuance. This data can be entered by the passenger via keyboard or wireless means, or electronically retrieved from the old passport document; the old passport can be stored in the passenger card or provided as a machine readable document. After the data entries are made, the passenger will read and sign and date the oath/affidavit statement; for example, via a handwriting recognition means coupled to or included within the passenger card. If previously certified by a certification center, the passenger's digital signature can also be included into the form-template as is; for example, retrieved from within the card or downloaded from the center's database. To complete the application form, the passenger's photo has to be included as well. The two recent identical photos, which have to conform to the requirements imposed by the passport services agency, can be provided via a digitized picture of the passenger's physical appearance. This picture can be scanned-in via a biometrics box that is coupled to or embedded within the passenger card, as well as retrieved via a card-based picture-template or downloaded via an on-line communication means from a remote database. The picture stored in the card or database has to be taken within a predetermined time period, including reflect the actual appearance of the passenger at the time of renewal. The completed and signed form will be stored in the passenger card and communicated/uploaded together to the passport services agency for further processing. The cardholder will also forward adequate payment; for example, via the digital cash stored in the passenger card. The agency will verify the uploaded application, for example, by comparing the provided information against data stored in a Government database including the old passport data and photo of the applicant, as well as by clearing the electronic payment.

Upon approval of the application, the agency will renew/issue the new passport while compiling the electronic passport for that passenger. The compiled information can be stored in the agency database, including downloaded into the passenger card. To control access to the new passport data, the agency can protect the data via security information that is unique to the rightful passport-holder. For example, to download the new passport into the passenger card, the passenger has to provide the matching SSN or signature. For more sophisticated protection schemes, the agency can encrypt the passport data with a secret key or the passenger's biometrics and the passenger has to provide the secret key or matching biometrics to download and unlock the passport data. The agency can also attach to the data a public key certificate to certify the passport as being issued by that agency. After access is allowed, the new passport will be stored in the passenger card while overwriting the old passport data. The card-based, old passport data can also cancel itself automatically if a predetermined condition is met; for example, the expiration date of the old passport will be compared against the date provided by the system clock, and if the expiration date has reached or gone beyond the systems date, that passport will be erased. The new passport data will be provided as an electronic representation of a conventional passport document. This electronic passport-template is tamper proof while also allowing selected entries to be made later on. The tamper proof, electronic pages (e.g. card-based data fields) of the passport comprise the passport number, as well as the bearer's photo and other personal data and information about the legitimate passport-holder. These pages further comprise coded data and other important information provided by the passport agency. The latter information refers to health matters, customs service, restrictions and import rules, additional travel information, as well as instructions about how to proceed in the case of lost, theft or destruction of the passport. This information also spells out the rights and responsibilities of all U.S. citizens and of visitors when entering the United States. Included into this information are also pointers and telephone numbers to Government pamphlets and databases where one can order or look-up more detailed information relating to passport holders. This information can only be displayed, viewed, or printed-out; no alterations are possible. The entries allowed to be made onto certain pages, refer to the bearer's name and address in the USA/abroad to be inputted by the passport-holder, visa-related entries to be made by foreign officials, or amendments and endorsements to be compiled by authorized entities. For instance, if applying for a visa, the method used for the renewal of the passport can also be employed to obtain that visa. The passport-holder displays the visa-application form, fills it out, attaches adequate payment, and uploads the information to the foreign embassy/consulate. Upon approval, the visa will be downloaded into the passenger card and stored in the passport-template that was identified by the passport number or via other unique information relating to the visa-applicant. In the same context, the passport holder can also couple the card to a healthcare database including the holder's medical record, and download any information about required vaccinations, such as an International Certificate of Vaccination against yellow fever, and store it in the immunization-template. The passport bearer can also download recommendations about other vaccinations or medications and certain preventive measures advisable for travelers. To make sure the card-based immunization pass is up to date, the passport holder can contact a healthcare provider, and download the appropriate information upon providing proper identification; the care provider can also certify the downloaded information to proof the authenticity thereof. The card can be further coupled to an insurance database, to downloaded proof of health insurance, which might be required outside the USA, into the card.

I claim:

1. A method for utilizing a portable passport device for immigration/customs declaration purposes; the method comprising the steps of:

storing an immigration/customs form in said portable passport device;

subsequently coupling said portable passport device to an immigration/customs database;

automatically uploading by said portable passport device said immigration/customs form to said immigration/customs database;

automatically verifying by the database the uploaded form; and in response to the verification step, storing by the database a verification stamp into the portable device;

said immigration/customs form relating to a particular device-holder;

subsequently coupling the portable device to a control module monitoring device-holder traffic through a plurality of gates;

automatically retrieving from the device by said control module a set of data comprising said immigration/customs form; and based upon the retrieved data from the passport device, automatically directing by the module said particular device-holder to a particular gate.

2. The method in claim 1 wherein said portable passport device is a smart card comprising a memory for storing said immigration/customs form.

3. The method in claim 1 wherein said portable passport device is a pocket-sized computer comprising a means for displaying said immigration/customs form unto the device.

4. The method in claim 1 wherein the step of storing said immigration/customs form in the device comprising:

editing the data contents of said immigration/customs form; and storing the edited form in said portable passport device.

5. The method in claim 4 wherein the step of editing the form's data contents, comprising the steps of:

automatically locating by the form a data previously stored in said portable passport device; and automatically including by the device the located data into said immigration/customs form;

said data comprising the citizenship of said particular device-holder.

6. The method in claim 5 wherein said data further comprising an information relating to a trip made by said particular device-holder prior to arriving for immigration/customs declaration purposes; said information including the name of the transportation carrier used and name of country visited.

7. The method in claim 4 wherein the step of editing the form's data contents comprising the step of inputting into said immigration/customs form additional data comprising a signature of said particular device-holder.

8. The method in claim 7 wherein said additional data further comprising a description of items to be declared by said particular device-holder.

9. The method in claim 1 wherein said step of automatically verifying by the database the uploaded form, comprising a means for cross-checking a selected data included in said immigration/customs form with a corresponding information stored in a remote database; said selected data comprising a personal information of said particular device-holder, and said corresponding information comprising Government background information about individuals.

10. The method in claim 1 wherein said verification stamp is an approval stamp allowing said particular device-holder to enter a country including cross a border or to clear customs, if the verification step is successful; and said verification stamp is a follow-up stamp, if the verification step requires further investigation by and authorized agent.

11. The method in claim 10 wherein said follow-up stamp is a silent alarm comprising a means for conveying a standing of said particular device-holder;

said standing comprising a criminal activity committed by the device-holder in the past.

12. The method in claim 10 wherein said follow-up stamp is a tracer comprising a means for allowing a law enforcement agency to pinpoint the location of said particular device-holder.

13. The method in claim 1 wherein the step of automatically directing by the module the device-holder traffic comprising:

signaling via a predetermined light for the device-holder to proceed through said particular gate;

signaling via a different light for the device-holder to provide additional information.

14. The method in claim 13 wherein said different light comprising a yellow light requesting said particular device-holder to provide a life biometrics information.

15. The method in claim 14 wherein said different light comprising a red light instructing said particular device-holder to stop by an Immigration Naturalization Services (INS) or customs agent.

* * * * *